United States Patent
Yuan

(10) Patent No.: US 12,248,404 B2
(45) Date of Patent: Mar. 11, 2025

(54) ZNS STANDARD BASED STORAGE DEVICE PROVIDING DATA COMPRESSION AND METHOD THEREOF

(71) Applicant: BEIJING MEMBLAZE TECHNOLOGY CO., LTD, Beijing (CN)

(72) Inventor: Rong Yuan, Beijing (CN)

(73) Assignee: BEIJING MEMBLAZE TECHNOLOGY CO., LTD, Beijing (CN)

( * ) Notice: Subject to any disclaimer, the term of this patent is extended or adjusted under 35 U.S.C. 154(b) by 220 days.

(21) Appl. No.: 17/646,311

(22) Filed: Dec. 29, 2021

(65) Prior Publication Data
US 2022/0206952 A1    Jun. 30, 2022

(30) Foreign Application Priority Data
Dec. 30, 2020    (CN) .......................... 202011622910.5

(51) Int. Cl.
*G06F 12/10*    (2016.01)
(52) U.S. Cl.
CPC ...... *G06F 12/10* (2013.01); *G06F 2212/1056* (2013.01); *G06F 2212/657* (2013.01)
(58) Field of Classification Search
CPC .... G06F 3/0679; G06F 12/0246; G06F 3/061; G06F 3/0659; G06F 2212/7201; G06F 3/0631; G06F 3/0644; G06F 2212/7202; G06F 12/0804; G06F 12/1009; G06F 2212/401; G06F 2212/222; G06F 12/10; G06F 12/0292; G06F 12/02
(Continued)

(56) References Cited

U.S. PATENT DOCUMENTS

| 10,613,756 B2 * | 4/2020 | Shin ........................ G06F 3/064 |
| 2006/0232593 A1 * | 10/2006 | Lap Lai .................. G09G 5/393 345/555 |

(Continued)

OTHER PUBLICATIONS

Hellwig, Christoph et al.;—Technical Proposal ID 4053 Zoned Namespaces; NVM Express; Jun. 15, 2020; 70 pgs.

(Continued)

*Primary Examiner* — Yaima Rigol
*Assistant Examiner* — Edward Waddy, Jr.
(74) *Attorney, Agent, or Firm* — HAUPTMAN HAM, LLP

(57) ABSTRACT

Provided are ZNS standard based storage device providing data compression and method thereof. A provided method for processing an Input/Output (IO) command includes: providing, by a host to a storage device, a first command for writing data to a first storage zone; allocating, by the storage device according to a Write Pointer (WP) of the first storage zone, a first logical address index to the data to be written by the first command, wherein the first logical address index and a first size of the data to be written by the first command define a first logical address space; compressing the data to be written by the first command to obtain compressed data; storing the compressed data; recording an address for storing the compressed data in association with the first logical address index; providing the first logical address index to the host; and recording, by the host, a first host logical address (HLBA) accessed by the first command in association with the first logical address index.

18 Claims, 12 Drawing Sheets

(58) Field of Classification Search
USPC ...... 711/103, 154, 12.008, 141, 12.001, 206, 711/12.002, 100, 203
See application file for complete search history.

(56) References Cited

U.S. PATENT DOCUMENTS

| | | | |
|---|---|---|---|
| 2009/0327598 A1* | 12/2009 | Tamura | G11B 20/1217 711/170 |
| 2012/0072641 A1* | 3/2012 | Suzuki | G06F 3/064 711/E12.008 |
| 2016/0011786 A1* | 1/2016 | Ninose | G06F 3/0616 711/103 |
| 2019/0188125 A1* | 6/2019 | Lin | G06F 3/0652 |
| 2019/0272852 A1* | 9/2019 | Feldman | G11B 20/1258 |

OTHER PUBLICATIONS

Base Specification; NVM Express; Revision 1.4; Jun. 10, 2019; 403 pgs.

* cited by examiner

| Write/append command | sLBA | Length |
|---|---|---|
| W0/AP0 | Zone_sLBA+0 | 8 sectors (4 KB) |
| W1/AP1 | Zone_sLBA+8 | 16 sectors (8 KB) |
| W2/AP2 | Zone_sLBA+24 | 32 sectors (16 KB) |
FIG. 3D
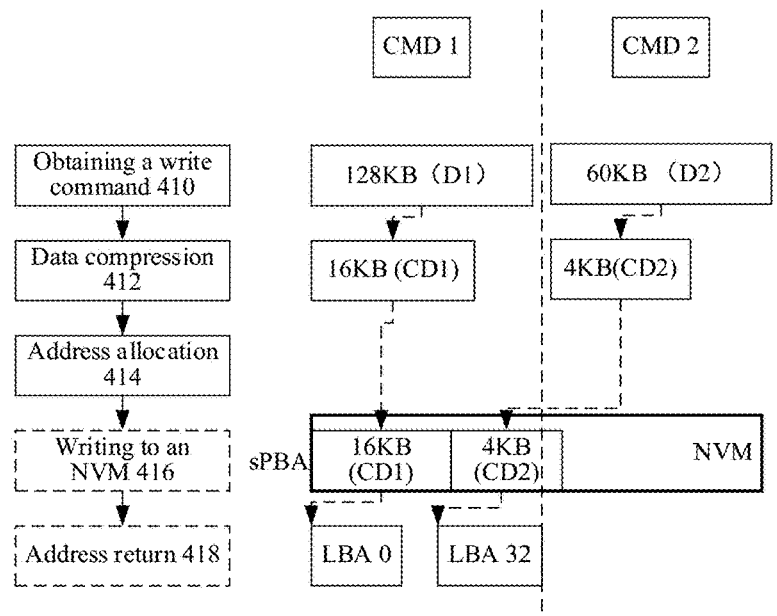
FIG. 4A
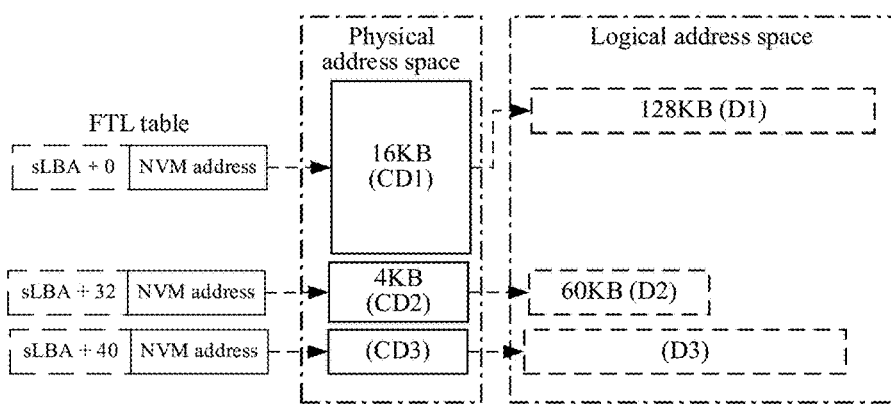
FIG. 4B

ZNS STANDARD BASED STORAGE DEVICE PROVIDING DATA COMPRESSION AND METHOD THEREOF

RELATED APPLICATIONS

The present application claims priority from Chinese Application Number 2020116229105 filed Dec. 30, 2020, the disclosure of which is hereby incorporated by reference herein in its entirety.

TECHNICAL FIELD

The present application relates to storage technologies, in particular, to the method for providing compression using Zoned Name Space (ZNS) standard, the storage device thereof, and the host using the storage device.

BACKGROUND

FIG. 1 shows a block diagram of a storage device. A storage device 102 is coupled with a host and used to provide a storage capability for the host. The host and the storage device 102 may be coupled in a variety of ways. The host and the solid-state storage device 102 are connected by coupling means including but not limited to, for example, a Serial Advanced Technology Attachment (SATA), a Small Computer System Interface (SCSI), a Serial Attached SCSI (SAS), Integrated Drive Electronics (IDE), a Universal Serial Bus (USB), Peripheral Component Interconnect Express (PCIE), NVM Express (NVMe), an Ethernet, a fiber channel, a wireless communication network, or the like. The host may be an information processing device capable of communicating with the storage device by the above-mentioned means, for example, a personal computer, a tablet computer, a server, a portable computer, a network switch, a router, a cellular phone, a personal digital assistant, or the like. The storage device 102 includes an interface 103, a control component 104, one or more NVM chips 105, and a Dynamic Random Access Memory (DRAM) 110.

A NAND flash memory, a phase-change memory, a Ferroelectric RAM (FeRAM), a Magnetic Random Access Memory (MRAM), a Resistive Random Access Memory (RRAM), an) (Point memory, or the like are common NVMs.

The interface 103 may be adapted to exchange data with the host by means of a SATA, IDE, a USB, PCIE, NVMe, a SAS, an Ethernet, a fiber channel, or the like.

The control component 104 is used to control data transmission between the interface 103, the NVM chip 105 and the DRAM 110, and is further used for storage management, host logical address-to-flash physical address mapping, erasure equalization, bad block management, or the like. The control component 104 may be implemented in a variety of ways such as software, hardware, firmware, or a combination thereof. For example, the control component 104 may be a Field-Programmable Gate Array (FPGA), an Application Specific Integrated Circuit (ASIC), or a combination thereof. The control component 104 may also include a processor or a controller, and software is executed in the processor or a controller to control hardware of the control component 104 to process an Input/Output (IO) command. The control unit 104 may also be coupled to the DRAM 110 and access data of the DRAM 110. The DRAM can store a Flash Translation Layer (FTL) table and/or data of a cached IO command.

The control component 104 includes a flash memory interface controller (or called a medium interface controller or a flash channel controller). The flash memory interface controller is coupled to the NVM chip 105, sends a command to the NVM chip 105 in a manner that follows an interface protocol of the NVM chip 105 to operate the NVM chip 105, and receives a command execution result output from the NVM chip 105. Known NVM chip interface protocols include "Toggle", "ONFI" or the like.

On a storage medium, data is usually stored and read in pages, and erased in blocks. A block (also called a physical block) includes multiple pages. A page (called a physical page) on a storage medium has a specified size, for example, 17664 bytes. The physical page may also have other sizes.

In a storage device, an FTL is used to maintain mapping information from a logical address to a physical address. The FTL is implemented by, for example, software, firmware, and/or hardware, which is part of an ASIC, running in a CPU of a control component.

FIG. 2 is a schematic diagram of an FTL.

A storage device provides a logical address space to a host. The host accesses the storage device using the logical address. An FTL maps the logical address provided by the host to a physical address.

A logical address constitutes a storage space of a solid-state storage device as perceived by upper-layer software such as an operating system. The smallest unit that can be addressed by a logical address is called, for example, a logical block or a sector (for simplicity, unless otherwise specified, the use of logical blocks and sectors below is interchangeable). A logical address that addresses a logical block is also called a Logical Block Address (LBA). The logical block has a specified size, for example, 512 B (bytes), 2 KB, 4 KB, 16 KB, or the like. A physical address is an address used to access a physical storage unit (for example, a physical page) of a NVM of a storage device. In the related art, an intermediate address form can also be used to implement address mapping. For example, a logical address is mapped to an intermediate address, and the intermediate address is further mapped to a physical address.

A table structure storing mapping information from a logical address to a physical address is called an FTL table. The FTL table is important metadata in a storage device. Generally, entries in the FTL table record address mapping relationship in the storage device in units of logical blocks. Optionally, each entry in the FTL table represents multiple logical blocks so as to balance the size of the FTL table and the management granularity of the storage space, for example, 8 logical blocks having consecutive logical addresses.

The FTL table includes, for example, multiple FTL entries, each FTL entry corresponds to one or more consecutive logical blocks, and the value of the FTL entry records the address of a storage space provided for the one or more consecutive logical blocks (for clarity, the storage space is called an NVM data frame, and the address of the storage space is called an NVM data frame address).

The FTL table is stored in, for example, the DRAM 110 (also referring to FIG. 1) or a SRAM. According to an accessed logical address, the index of a corresponding FTL entry is obtained, and a NVM data frame that provides a storage space for a logical block is obtained from the FTL entry.

An NVM data frame address is, for example, a physical address for accessing a physical page of an NVM chip, a physical address for accessing multiple combined physical pages of the NVM chip (the combined physical pages are, for example, physical pages located on multiple planes of a same or different Logical Unit(s) (LUN(s))), or a physical address for accessing some data units in a physical page of the NVM chip.

FTLs of some storage devices are provided by hosts to which the storage devices are coupled. Memories of the hosts store FTL tables, and CPUs of the hosts execute software to provide the FTLs. There are also some storage management apparatuses arranged between hosts and storage devices providing FTLs.

An NVMe protocol (available at https://nvmexpress.org/wp-content/uploads/NVM-Express-1_ 4-2019.06.10-Ratified.pdf) or the like defines the way in which data is exchanged between a host and a storage device. An NVMe organization is still discussing zone (Storage zone) and ZNS (Zone Name Space) (available at https://nvmexpress.org/wp-content/uploads/NVM-Express-1.4-Ratified-TPs-1.zip). A zone is a continuous range of LBAs managed as single units, and a ZNS is a Name Space that includes multiple zones. Some zones need to be written to sequentially in the order of logical addresses. A host ensures that an IO command provided to a zone meet requirements.

FIG. 3A is a schematic diagram of a zone.

A storage device provides a logical address space (LBA range) having a size of, for example, 1,000 GB. The logical address space includes multiple (n+1) zones, and each zone occupies a logical address space corresponding to its number. The host can regard the zones as storage objects, and access a designated logical address space of the storage device according to zone numbers and offset values in the zones. The size of the logical address space occupied by a zone is called a zone size. In the example of FIG. 3A, the zone size is, for example, 512 MB.

With continuing reference to FIG. 3A, Zone 0 includes storage spaces (or logical address ranges) (310, 320, and 340). The storage space 310 is a storage space of Zone 0 to which data is written. The storage space 320 is a storage space to which no data has been written and to which data may be written. Moreover, the host may not write data to the storage space 340 due to storage space alignment or the like. The maximum number of logical blocks to which data may be written in a zone is referred to as zone capacity, for example, the size indicated by the storage space 310 and the storage space 320. Thus, the zone capacity is not greater than the zone size. A Write Pointer (WP) indicates the starting location of the storage space 320 of the zone.

When writing data to the zone, data is always written to a storage space of a specified size starting from the location indicated by WP and having consecutive addresses.

FIG. 3B to FIG. 3D are schematic diagrams of writing data to a zone.

A host writes data to a zone by using two commands (a write command and an append command). FIG. 3B shows a write command, and FIG. 3C shows an append command.

The write command instructs to write data to the zone, and the write command indicates the starting address for writing data. The address should be consistent with the current WP, and the data is written into a continuous logical address space of the zone starting from the location indicated by the current WP. Each zone is restricted to process only one write command at the same time. After one write command has been processed, a next write command can be sent to the zone. With reference to FIG. 3B, cells represent the logical address space of the zone, the rightward direction is a positive direction, the starting logical address of the zone (denoted as Zone_sLBA) is at the leftmost end, and W0, W1 and W2 each represents a write command sent to the zone.

The write command W0 is to write 4 KB of data to the zone. When the write command W0 is received, the WP indicates the logical address Zone_sLBA of the zone; after the write command W0 has been processed, data is written to a 4 KB logical address range of the zone starting from logical address 0, and the WP is updated to point to the logical address Zone_sLBA+4 KB (WP0). Then, a write command W1 (the size of the data to be written is 8 KB) is received; after the write command W1 has been processed, the data is written to a 8 KB logical address range of the zone starting from the logical address Zone_sLBA+4 KB, and the WP is updated to point to the logical address Zone_sLBA+12 KB (WP1). Then, a write command W2 (the size of the data to be written is 16 KB) is received; after the write command W2 has been processed, the data is written to a 16 KB logical address range of the zone starting from the logical address Zone_sLBA+12 KB, and the WP is updated to point to the logical address Zone_sLBA+28 KB (WP2).

The append command instructs to write data to a continuous logical address space of the zone starting from the location indicated by the current WP. The number of append commands that can be processed at the same time in each zone is not limited. The host is allowed to send multiple append commands to the zone at the same time, or send an append command to the zone before the previous append command has been processed. With reference to FIG. 3C, three append commands (AP0, AP1, and AP2) are concurrently provided to the zone. As an example, the initial location indicated by the WP is the starting logical address of the zone (denoted as Zone_sLBA). When using an append command, the host does not care about the logical address where data corresponding to the append command is written, so the append command does not indicate the specific value of the logical address where the data is written; the storage device determines the logical address serving the append command according to the location of the WP when the append command is processed, and returns the determined logical address to the host after the append command has been processed or submitted, so that the host knows the storage location of the data corresponding to the append command in the zone, and the host can retrieve the written data by using the storage location. With reference to FIG. 3C, the storage device receives three append commands (AP0, AP1, and AP2), and the storage device determines the processing order of the three append commands. As an example, the storage device decides to process the three append commands in the order of AP0, AP1, and AP2. How to process write commands and append commands inside the storage device is not the content concerned in the present application. As an example, the storage device writes data corresponding to the append command AP0 into a 4 KB continuous logical address space starting from the logical address Zone_sLBA, writes data corresponding to the append command AP1 into a 8 KB continuous logical address space starting from the logical address Zone_sLBA+4 KB, and writes data corresponding to the append command AP2 into a 16 KB continuous logical address space starting from the logical address Zone_sLBA+12 KB.

Regardless of whether it is a write command or an append command, after processing or submitting the same, the storage device returns to the host the starting address (denoted as sLBA) of a logical address space that carries data corresponding to the write command or the append command. FIG. 3D shows distribution of data corresponding to the three commands in the zone obtained by the host after the processing of the three commands (write commands or append commands). As an example, the sector size of the zone is 512 B, and the starting address of the zone is Zone_sLBA. The starting address of the logical address space occupied by the write command W0 (or the append command AP0) is Zone_sLBA+0 (the unit is the number of sectors), and the length is 8 (the unit is the number of sectors); the starting address of the logical address space occupied by the write command W1 (or the append command AP1) is Zone_sLBA+8 and the length is 16; the starting address of the logical address space occupied by the write command W2 (or the append command AP2) is Zone_sLBA+24, and the length is 32.

Optionally, the host records the starting address (denoted as sLBA) of the logical address space of the data corresponding to each write command/append command. Still optionally, the host further records the length of the data corresponding to each write command/append command (or the length of the logical address space in which the data is stored). The data corresponding to each write command/append command is also called an object as a whole, and the attributes thereof include the starting address and length of the logical address space of the storage object, so that the object can be obtained according to the attributes of the object.

In order to read data from the zone, the host sends a read command to the storage device. The starting address and length are indicated in the read command. The storage device reads data of a specified length from the starting address and provides the data to the host as a response to the read command.

SUMMARY

Data can be compressed. By compressing data, the data storage density of a storage device can be increased. Therefore, it is desirable to provide a storage device having a data compression capability. However, compression changes the size of data, which in turn introduces additional complexity to addressing and management of the data. It is hoped to eliminate or minimize the impact of the complexity introduced by compression on a host, so that the host can access the storage device in an existing way. The storage device provides data compression and/or decompression, and the data compression and/or decompression by the storage device is transparent to the host. Therefore, the host does not need to perceive that data is compressed and/or decompressed inside the storage device, and does not need to modify the protocol, but accesses the storage device by using an existing write command, append command and/or read command.

The introduction of zone provides further support for achieving the objective of the invention. In order to access a zone, the host maintains the starting address (sLBA) and (uncompressed) length of data (an object) corresponding to a write command/append command, and uses the starting address (sLBA) and (uncompressed) length in a read command to read the object from the storage device. According to the storage device in embodiments of the present application, by compressing/decompressing an object internally without changing the semantics of a write command, append command, and/or read command provided to the host, and storing the compressed data on an NVM, the data storage density is improved, without introducing additional complexity to the host for accessing the compressed data.

According to a first aspect of the present application, provided is a first method for processing an IO command according to the first aspect of the present application, including: providing, by a host to a storage device, a first command for writing data to a first storage zone; allocating, by the storage device according to a WP of the first storage zone, a first logical address index to the data to be written by the first command, where the first logical address index and a first size of the data to be written by the first command define a first logical address space; compressing the data to be written by the first command to obtain compressed data; storing the compressed data; recording an address for storing the compressed data in association with the first logical address index; providing the first logical address index to the host; and recording, by the host, a first host logical address (HLBA) accessed by the first command in association with the first logical address index.

According to the first method for processing an IO command according to the first aspect of the present application, provided is a second method for processing an IO command according to the first aspect of the present application, where the storage device uses the WP of the first storage zone as the first logical address index, or uses a key generated according to the WP of the first storage zone as the first logical address index; and the method further includes: updating, by the storage device, the WP of the first storage zone according to a size of the compressed data.

According to the first or second method for processing an IO command according to the first aspect of the present application, provided is a third method for processing an IO command according to the first aspect of the present application, further including: providing, by the host to the storage device, a second command for writing data to the first storage zone; allocating, by the storage device according to the updated WP, a second logical address index to the data to be written by the second command, where the second logical address index and a second size of the data to be written by the second command define a second logical address space, and even if the difference between the second logical address index and the first logical address index is smaller than the first size, the second logical address space and the first logical address space do not overlap.

According to the third method for processing an IO command according to the first aspect of the present application, provided is a fourth method for processing an IO command according to the first aspect of the present application, further including: compressing, by the storage device, the data to be written by the second command to obtain second compressed data; storing the second compressed data; recording an address for storing the second compressed data in association with the second logical address index; and updating the WP according to a size of the second compressed data.

According to the first aspect of the present application, provided is a fifth method for processing an IO command according to the first aspect of the present application, including: providing, by a host to a storage device, a first command for writing data to a first storage zone, where the first command indicates a first logical address index; compressing, by the storage device, the data to be written by the first command to obtain compressed data; storing the compressed data; recording an address for storing the compressed data in association with the first logical address index; generating a second logical address index according to the first logical address index and a size of the compressed data, and providing the second logical address index to the host; and recording, by the host, a first host logical address (HLBA) accessed by the first command in association with the first logical address index.

According to the fifth method for processing an IO command according to the first aspect of the present application, provided is a sixth method for processing an IO command according to the first aspect of the present application, where the first logical address index and a first size of the data to be written by the first command define a first logical address space.

According to the fifth or sixth method for processing an IO command according to the first aspect of the present application, provided is a seventh method for processing an IO command according to the first aspect of the present application, further including: updating, by the storage device, a WP of the first storage zone according to the size of the compressed data; and updating, by the host, the WP of the first storage zone using the second logical address index.

According to any one of the fifth to seventh methods for processing an IO command according to the first aspect of the present application, provided is an eighth method for processing an IO command according to the first aspect of the present application, further including: providing, by the host to the storage device, a second command for writing data to the first storage zone, where the second command indicates the second logical address index; and compressing, by the storage device, the data to be written by the second command to obtain second compressed data; storing the second compressed data; recording an address for storing the second compressed data in association with the second logical address index; and generating a third logical address index according to the second logical address index and a size of the second compressed data, and providing the third logical address index to the host, where the second logical address index and a second size of the data to be written by the second command define a second logical address space.

According to any one of the first to eighth methods for processing an IO command according to the first aspect of the present application, provided is a ninth method for processing an IO command according to the first aspect of the present application, further including: to generate the first command, allocating, by the host, an available zone as the first storage zone, or obtaining a zone that can hold the data to be written by the first command as the first storage zone; and recording the first host logical address (HLBA) accessed by the first command in association with the first storage zone.

According to any one of the first to ninth methods for processing an IO command according to the first aspect of the present application, provided is a tenth method for processing an IO command according to the first aspect of the present application, where the first logical address index indicates the first storage zone.

According to any one of the first to tenth methods for processing an IO command according to the first aspect of the present application, provided is an eleventh method for processing an IO command according to the first aspect of the present application, where the host further records the first logical address index in association with the first size of the data to be written by the first command.

According to any one of the first to eleventh methods for processing an IO command according to the first aspect of the present application, provided is a twelfth method for processing an IO command according to the first aspect of the present application, where there is no associated logical address index for one or more logical addresses of the host; in response to the need to read data from a third host logical address, if the host does not record a logical address index associated with the third host logical address, it is indicated that an error occurs; and if the host obtains a third logical address index associated with the third host logical address, the host provides, to the storage device, a third command for reading data from the third logical address index.

According to any one of the first to eleventh methods for processing an IO command according to the first aspect of the present application, provided is a thirteenth method for processing an IO command according to the first aspect of the present application, where there is no associated logical address index for one or more host addresses of the host; in response to the need to read data from a third host logical address, if the host does not record a logical address index associated with the third host logical address, determining a third logical address space corresponding to the third host logical address according to the recorded logical address index and an associated size, using the third logical address index defining the third logical address space as a logical address index associated with the third host logical address, obtaining a starting location of the data to be read from the third host logical address in the third logical address space according to a difference between the third host logical address and a host logical address recorded by the host and associated with the third logical address index, and providing, to the storage device, a third command for reading data from the third logical address index; and if the host obtains a third logical address index associated with the third host logical address, providing, to the storage device, a third command for reading data from the third logical address index.

According to any one of the first to eleventh methods for processing an IO command according to the first aspect of the present application, provided is a fourteenth method for processing an IO command according to the first aspect of the present application, further including: to generate the first command, allocating, by the host, a first zLBA space from a zLBA space of the first storage zone, where a size of the first zLBA space can hold the data to be written by the first command, where the zLBA space of the first storage zone is a one-dimensional linear space, and has a size the same as a capacity of the first storage zone, and each element of the zLBA space is addressed by a zLBA; and recording, by the host, the first host logical address (HLBA) accessed by the first command in association with the first zLBA space, where elements of a host logical address (HLBA) space defined by the first host logical address (HLBA) and a first size correspond to elements of the first zLBA space.

According to the fourteenth method for processing an IO command according to the first aspect of the present application, provided is a fifteenth method for processing an IO command according to the first aspect of the present application, further including: in response to the need to read data from the third host logical address, obtaining, by the host, a third zLBA associated with the third host logical address, determining a third logical address space corresponding to the third zLBA according to the recorded logical address index and an associated size, using the third logical address index defining the third logical address space as a logical address index associated with the third host logical address, and providing, to the storage device, a third command for reading data from the third logical address index.

According to the fifteenth method for processing an IO command according to the first aspect of the present application, provided is a sixteenth method for processing an IO command according to the first aspect of the present application, where the host further obtains a starting location of the data to be read from the third host logical address in the third logical address space according to a difference of the third zLBA and a zLBA recorded by the host and associated with the third logical address index, and uses data of a specified size starting from the starting location in the third logical address space as the data to be read from the third host logical address.

According to any one of the first to sixteenth methods for processing an IO command according to the first aspect of the present application, provided is a seventeenth method for processing an IO command according to the first aspect of the present application, further including: providing, by the host to the storage device, a fourth command for writing data to a second NS; allocating, by the storage device, a physical address to the data to be written by the fourth command; recording, in association with the allocated physical address, a host logical address accessed by the fourth command, where the second NS is different from a NS where the first storage zone is located, and the data to be written by the fourth command is metadata for the data to be written by the first command.

According to any one of the first to seventeenth methods for processing an IO command according to the first aspect of the present application, provided is an eighteenth method for processing an IO command according to the first aspect of the present application, where a logical address index, which is not associated with an NVM address, in the storage device is an invalid logical address index; a logical index associated with an NVM address is a valid logical address index; and the sum of sizes of all logical address spaces defined by all valid logical address indexes of a zone are accumulated to obtain the zone capacity of the zone.

According to any one of the first to eighteenth methods for processing an IO command according to the first aspect of the present application, provided is a nineteenth method for processing an IO command according to the first aspect of the present application, where the host provides, to the storage device, a fifth command for reading data from a fifth logical address index; and the method further includes: identifying, by the storage device, whether the fifth logical address index is a valid logical address index; if the fifth logical address index is a valid logical address index, reading fifth compressed data according to the fifth logical address index; decompressing the fifth compressed data to obtain fifth decompressed data; and using all or part of the fifth decompressed data as a processing result of the fifth command.

According to the nineteenth method for processing an IO command according to the first aspect of the present application, provided is a twentieth method for processing an IO command according to the first aspect of the present application, where if the fifth logical address index is not a valid logical address index, the storage device sends a processing result of the fifth command to the host, and the processing result of the fifth command indicates that there is an error in the fifth command.

According to the nineteenth or twentieth method for processing an IO command according to the first aspect of the present application, provided is a twenty-first method for processing an IO command according to the first aspect of the present application, where the fifth command indicates a fifth length; and the method further includes: if a size of the fifth decompressed data is smaller than the fifth length, reading, by the storage device, sixth compressed data after the fifth compressed data according to an address of the fifth compressed data; decompressing the sixth compressed data to obtain sixth decompressed data; repeating the above process until the sum of sizes of all decompressed data read is not smaller than the fifth length; and using a part, which starts from the beginning and has a length equal to the fifth length, of all the decompressed data read as a whole as a processing result of the fifth command.

According to any one of the nineteenth to twenty-first methods for processing an IO command according to the first aspect of the present application, provided is a twenty-second method for processing an IO command according to the first aspect of the present application, further including: providing, by the host to the storage device, a sixth command for reading data from a sixth logical address index, where the sixth command indicates a plurality of logical addresses and a plurality of lengths corresponding to each of the plurality of logical addresses; if a first logical address in the plurality of logical addresses is a valid logical address index, reading compressed data according to the first logical address, and decompressing the compressed data to obtain complete data of a sixth logical address space corresponding to the first logical address; obtaining a plurality of pieces of data from the complete data in the sixth logical address space according to the plurality of logical addresses indicated by the sixth command and the plurality of lengths corresponding to each of the plurality of logical addresses as a processing result of the sixth command.

According to a second aspect of the present application, provided is a first method for processing an IO command according to the second aspect of the present application, including: providing, by a host to a storage device, a first command for reading data from a first storage zone, where the first command indicates a first logical address index; identifying, by the storage device, whether the first logical address index is a valid logical address index; if the first logical address index is a valid logical address index, reading first compressed data according to the first logical address index; decompressing the first compressed data to obtain first decompressed data; and providing part or all of the first decompressed data to the host as a processing result of the first command.

According to the first method for processing an IO command according to the second aspect of the present application, provided is a second method for processing an IO command according to the second aspect of the present application, further including: if the first logical address index is not a valid logical address index, sending, by the storage device, a processing result of the first command to the host, where the processing result of the first command indicates that there is an error in the first command.

According to the first or second method for processing an IO command according to the second aspect of the present application, provided is a third method for processing an IO command according to the second aspect of the present application, where a length of the first compressed data read by the storage device according to the first logical address index is obtained from an NVM according to the first logical address index, or determined according to a distance between the first logical address index and a next valid logical address index.

According to any one of the first or third methods for processing an IO command according to the second aspect of the present application, provided is a fourth method for processing an IO command according to the second aspect of the present application, where the first command further indicates a first length of the data to be read; and the method further includes: if a size of the first decompressed data is smaller than the first length, reading second compressed data on the NVM after the first compressed data according to an address of the first compressed data in the NVM; decompressing the second compressed data to obtain second decompressed data; repeating the above process until the sum of sizes of all decompressed data read is not smaller than the first length; and using a part, which starts from the beginning and has a length equal to the first length, of all the decompressed data read as a whole as a processing result of the first command.

According to any one of the first to fourth methods for processing an IO command according to the second aspect of the present application, provided is a fifth method for processing an IO command according to the second aspect of the present application, further including: providing, by the host to the storage device, a second command for reading data from a first storage zone, where the second command indicates a plurality of logical addresses and a plurality of lengths corresponding to each of the plurality of logical addresses; if a first logical address in the plurality of logical addresses is a valid logical address index, reading compressed data according to the first logical address, and decompressing the compressed data to obtain complete data of a second logical address space corresponding to the first logical address; obtaining a plurality of pieces of data from the complete data in the second logical address space according to the plurality of logical addresses indicated by the second command and the plurality of lengths corresponding to each of the plurality of logical addresses as a processing result of the second command.

According to any one of the first to fifth methods for processing an IO command according to the second aspect of the present application, provided is a sixth method for processing an IO command according to the second aspect of the present application, further including: providing, by the host to the storage device, a third command for reading data from the first storage zone, where the third command indicates a third logical address index and a third length; if the third logical address index is a valid logical address index, reading, by the storage device, third compressed data according to the third logical address index; decompressing the third compressed data to obtain third decompressed data; if a length of the third decompressed data is smaller than the third length, obtaining a next valid logical address index adjacent to the third logical address index from an FTL table according to the third logical address index, reading fourth compressed data according to the next valid logical address index, and decompressing the fourth compressed data to obtain fourth decompressed data; and using a part, which starts from the beginning and has a length equal to the third length, of all the decompressed data read as a whole as a processing result of the third command.

According to any one of the first to fifth methods for processing an IO command according to the second aspect of the present application, provided is the sixth method for processing an IO command according to the second aspect of the present application, further including: if the sum of the length of the third decompressed data and the length of the fourth decompressed data is smaller than the third length, continuing to obtain a next valid logical address index from the FTL table, reading compressed data from the NVM according to the obtained valid logical address index, where the sum of lengths of decompressed data of all the compressed data read directly is not smaller than the third length.

According to any one of the first to sixth methods for processing an IO command according to the second aspect of the present application, provided is a seventh method for processing an IO command according to the second aspect of the present application, further including: providing, by the host to the storage device, a fourth command for writing data to the first storage zone; allocating, by the storage device, a fourth logical address index for the fourth command, where the fourth logical address index and a fourth size of the data to be written by the fourth command define a fourth logical address space; compressing the data to be written by the fourth command to obtain compressed data; storing the compressed data; recording an address for storing the compressed data in association with the fourth logical address index; providing the fourth logical address index to the host; and recording, by the host, a fourth host logical address (HLBA) accessed by the fourth command in association with the fourth logical address index.

According to any one of the first to sixth methods for processing an IO command according to the second aspect of the present application, provided is an eighth method for processing an IO command according to the second aspect of the present application, further including: providing, by the host to the storage device, a fourth command for writing data to the first storage zone, where the fourth command indicates a fourth logical address index; compressing, by the storage device, the data to be written by the fourth command to obtain compressed data; storing the compressed data; recording, in association with the fourth logical address index, an address for storing the compressed data; generating a fifth logical address index according to the fourth logical address index and a size of the compressed data, and providing the fifth logical address index to the host; and recording, by the host, a fourth host logical address (HLBA) accessed by the fourth command in association with the fourth logical address index.

According to a third aspect of the present application, provided is a method for processing an IO command according to the third aspect of the present application, including: obtaining a first command for writing data to a first storage zone; allocating, according to a WP of the first storage zone, a first logical address index to the data to be written by the first command, where the first logical address index and a first size of the data to be written by the first command define a first logical address space; compressing the data to be written by the first command to obtain compressed data; storing the compressed data; recording, in association with the first logical address index, an address for storing the compressed data; and providing the first logical address index as a response to the first command.

According to a fourth aspect of the present application, provided is a method for processing an IO command according to the fourth aspect of the present application, including: obtaining a first command for writing data to a first storage zone, where the first command indicates a first logical address index; compressing the data to be written by the first command to obtain compressed data; storing the compressed data; recording, in association with the first logical address index, an address for storing the compressed data; and generating a second logical address index according to the first logical address index and a size of the compressed data, and providing the second logical address index as a response to the first command.

According to a fifth aspect of the present application, provided is a storage system according to the fifth aspect of the present application, including a host and a storage device, where the host sends, to the storage device, a command for writing data to a first storage zone; the storage device executes the method according to the third aspect of the present application to process the command for writing data; and the host obtains a processing result of the command for writing data provided by the storage device, and records a logical address index indicated by the processing result of the command for writing data in association with a host logical address accessed by the command for writing data.

According to a sixth aspect of the present application, provided is a storage system according to the sixth aspect of the present application, including a host and a storage device, where the host sends, to the storage device, a command for writing data to a first storage zone; the storage device executes the method according to the fourth aspect of the present application to process the command for writing data; and the host obtains a processing result of the command for writing data provided by the storage device, and updates a WP of the first storage zone according to a logical address index indicated by the processing result of the command for writing data.

According to a seventh aspect of the present application, provided is a method for processing an IO command according to the seventh aspect of the present application, including: obtaining a first command for reading data from a first storage zone, where the first command indicates a first logical address index; identifying whether the first logical address index is a valid logical address index; if the first logical address index is a valid logical address index, reading first compressed data according to the first logical address index; decompressing the first compressed data to obtain first decompressed data; and using part or all of the first decompressed data as a processing result of the first command.

According to an eighth aspect of the present application, provided is an information processing device according to the eighth aspect of the present application, including a memory, a processor, and a program stored on the memory and executable on the processor, where when the processor executes the program, the method according to the third, fourth, or seventh aspect of the present application is implemented.

According to a ninth aspect of the present application, provided is a method for processing an IO command according to the ninth aspect of the present application, including: providing, to a storage device, a first command for writing data to a first storage zone; obtaining a first logical address index provided by the storage device; and recording a first host logical address (HLBA) accessed by the first command in association with the first logical address index.

According to a tenth aspect of the present application, provided is a method for processing an IO command according to the tenth aspect of the present application, including: providing, to a storage device, a first command for writing data to a first storage zone, where the first command indicates a first logical address index; obtaining a second logical address index provided by the storage device; recording a first host logical address (HLBA) accessed by the first command in association with the first logical address index; and updating a WP of the first storage zone according to the first logical address index.

According to an eleventh aspect of the present application, provided is a first method for processing an IO command according to the eleventh aspect of the present application, including: obtaining a first command for writing data; allocating a first logical address index and a first size to the data to be written by the first command, where the first logical address index and the first size define a first logical address space, the first size is a size of the first logical address space, and the first size can hold the data to be written by the first command that is not compressed; compressing the data to be written by the first command to obtain compressed data; storing the compressed data in an NVM; recording, in association with the first logical address index, an address for storing the compressed data in the NVM.

According to a twelfth aspect of the present application, provided is a first method for processing an IO command according to the twelfth aspect of the present application, including: obtaining a third command for reading data, where the third command indicates a third logical address and a third length; if the third address is a valid logical address index, reading third compressed data from an NVM according to the third address; decompressing the third compressed data to obtain third decompressed data; and using a part of the third data starting from the beginning and having a length equal to the third length as a processing result of the third command.

According to a thirteenth aspect of the present application, provided is a first storage system according to the thirteenth aspect of the present application, including a host and a storage device, where the host sends, to the storage device, a command for writing data; the storage device executes the method for processing an IO command according to the eleventh aspect of the present application to process the command for writing data; and the host obtains a processing result of the command for writing data provided by the storage device, and records a logical address index indicated by the processing result of the command for writing data as a logical address corresponding to the command for writing data; and the host further records a data length corresponding to the command for writing data.

According to the first storage system according to the thirteenth aspect of the present application, provided is a second storage system according to the thirteenth aspect of the present application, where the host sends, to the storage device, a command for reading data; the storage device executes the method for processing an IO command according to the twelfth aspect of the present application to process the command for reading data; and the host obtains a processing result of the command for reading data provided by the storage device.

According to a fourteenth aspect of the present application, provided is an information processing device, including a memory, a processor, and a program stored on the memory and executable on the processor, where when the processor executes the program, the method for processing an IO command according to the eleventh or twelfth aspect of the present application is implemented.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description show only some embodiments described in the present application, and those skilled in the art may still derive other accompanying drawings from these accompanying drawings.

FIG. 3B to FIG. 3D are schematic diagrams of writing data to a zone.

FIG. 4A is a schematic diagram of transparent compression provided according to an embodiment of the present application.

FIG. 4B is a schematic diagram of address space mapping according to an embodiment of the present application.

DETAILED DESCRIPTION

Figure 1:
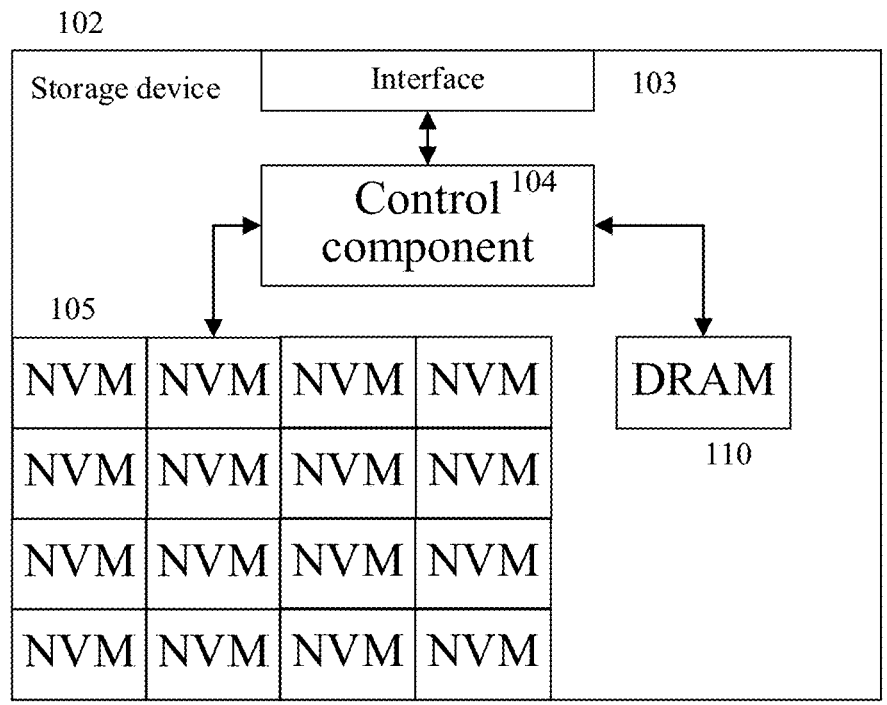
FIG. 1 is a block diagram of a storage device in the prior art.
Figure 2:
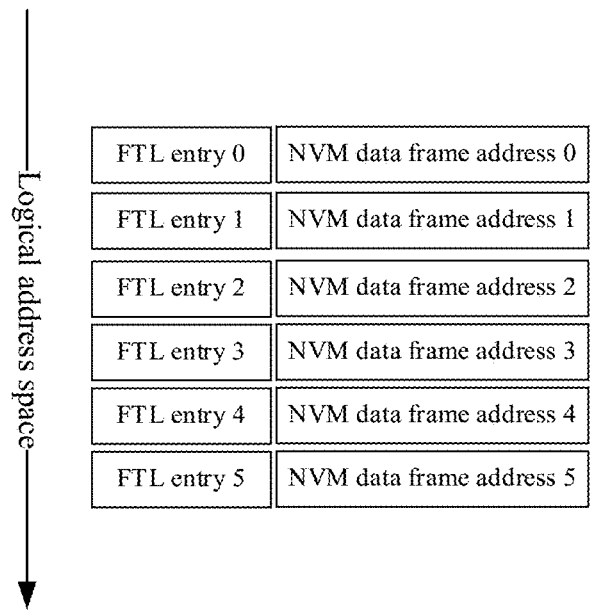
FIG. 2 is a schematic diagram of an FTL.
Figure 3A:
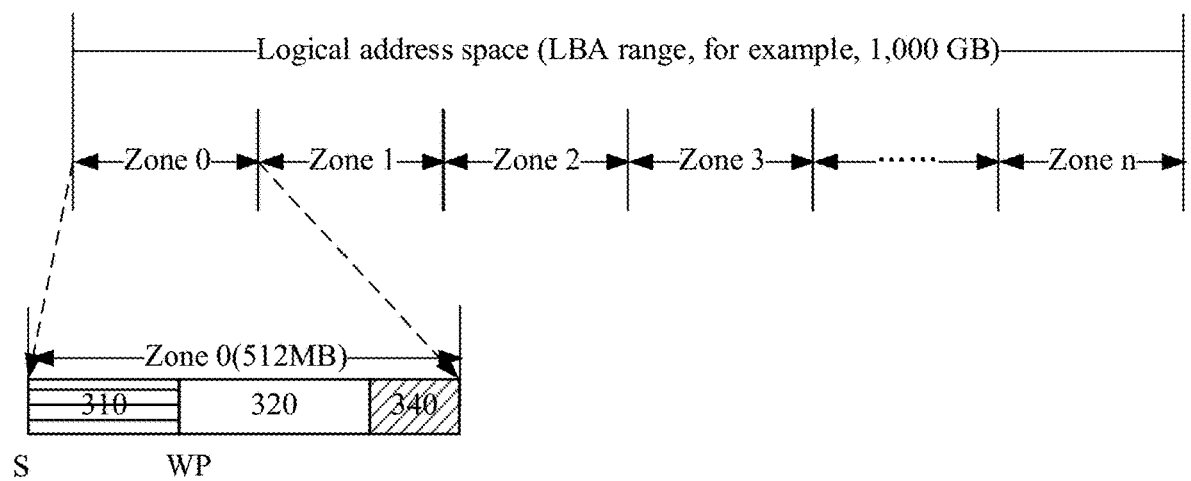
FIG. 3A is a schematic diagram of a zone.
Figure 3B:
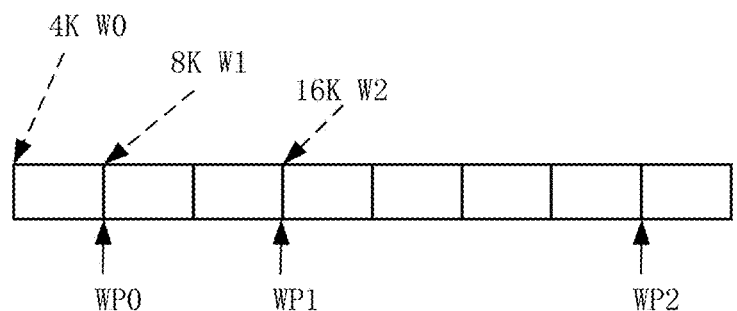
Figure 3C:
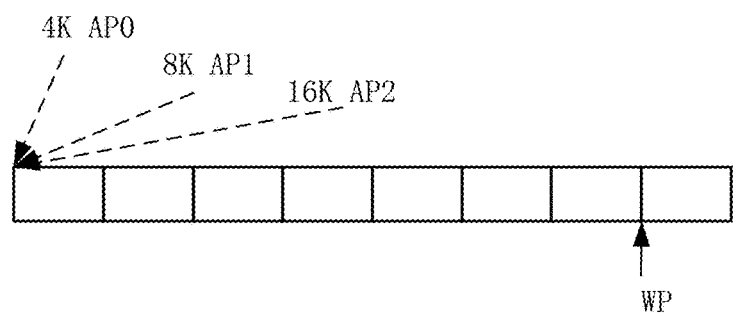

The following describes the technical solutions in the embodiments of the present application clearly and completely in conjunction with the accompanying drawings in the embodiments of the present application. Apparently, the described embodiments are some of the embodiments of the present application, not all of the embodiments. Based on the embodiments in the present application, all other embodiments obtained by those skilled in the art without creative work shall fall within the scope of protection of the present application.

FIG. 4A is a schematic diagram of transparent compression provided according to an embodiment of the present application.

In FIG. 4A, taking two commands (CMD1 and CMD2) as examples, the processes that a storage device compresses data corresponding to the commands are shown. Steps 410 to 418 shown on the left side of FIG. 4A are the method used to process the two commands. 128 KB of data (D1) needs to be written by command CMD1, and 60 KB of data (D2) needs to be written by command CMD2.

Understandably, commands for instructing to write data to a storage device include, for example, a write command and an append command. The write command indicates an address for carrying data to be written.

In response to receiving a command (CMD1 and CMD2) (410), data to be written by the command is compressed (412). Data D1 of command CMD1 is compressed to obtain compressed data (CD1), the size of which is 16 KB, and data D2 of command CMD2 is compressed to obtain compressed data (CD2), the size of which is 4 KB. Understandably, the size of the compressed data may not be an integer multiple of a logical block size (for example, may be 3.7 KB). In this case, the compressed data is aligned with the logical block size as the boundary (for example, if the logical block size is 512 bytes, eight logical blocks are allocated to the compressed data of 3.7 KB). In one example, the data (such as D1) corresponding to the command (such as CMD1) is compressed as a whole, and the obtained compressed data can be decompressed as a whole, but the compressed data cannot be partially decompressed. In another example, the data (such as D1) corresponding to the command is compressed in segments to obtain one or more segments, the size of each segment can be held in one sector, and each segment can be decompressed independently.

For the uncompressed data (D1 and D2), a logical address space (414) is allocated to hold the data. For a write command, the starting address of the allocated logical address space is an address indicated in the write command. For an append command, the starting address of the allocated logical address space is, for example, the starting address of a currently writable logical address space, or for ZNS, is for example, a logical address indicated by WP.

According to the embodiments of the present application, the starting address of the allocated logical address space is called a logical address index. Only the logical address index will be used to index an FTL table. Addresses of the allocated logical address space other than the starting address are not used to index the FTL table. The allocated logical address space is defined by two dimensions, i.e., the logical address index and the size of the allocated logical address space. Only the logical address index is used to describe the starting address of the logical address space allocated to the data to be written by the command, and other logical addresses of the logical address space are not used to describe the starting address of the logical address space. The capacity of the logical address space allocated to the data to be written by the command is only defined by the dimension which is the size of the allocated logical address space, so that the difference between the respective logical address indexes of the logical address spaces allocated for two adjacent commands does not represent the capacity of the logical address space allocated for the former command.

According to the embodiments of the present application, the difference between the respective logical address indexes of the logical address spaces allocated for two adjacent commands represents the size of the compressed data corresponding to the former command (aligned according to the logical block size). It can be understood that, according to the embodiments of the present application, it is necessary to obtain the size of compressed data of data to be written by one command before knowing the logical address space index corresponding to a next command.

For example, the starting address of a currently writable logical address space (or WP for ZNS, or a logical address indicated by CMD1 as a write command) is denoted as sLBA, and a logical address space starting from sLBA and having a length of 256 logical blocks (the logical block size is 512 B) is allocated to CD1.

Generally, if the size of the data (uncompressed) to be written by the command is denoted as DS, and the logical block size is denoted as SS, the length of the logical address range allocated to the uncompressed data to be written is ⌈DS/SS⌉ (the result of DS/SS is rounded up to an integer). Thus, according to the embodiments of the present application, uncompressed data to be written is distributed in the logical address space, and the size of the logical address space occupied by the data to be written corresponds to the size of the uncompressed data.

The logical address allocated for CMD2 is denoted as sLBA2, and sLBA2=sLBA+32, where 32 is the number of logical blocks occupied by compressed data CD1 corresponding to CMD1. The logical address space allocated for CMD2 is a logical address space starting from sLBA+32 and having a length of 120 logical blocks.

For an append command, after the logical address space is allocated, the WP needs to be updated. Generally, if the compressed size of the data to be written by the command is denoted as CS, and the logical block size is denoted as SS, the increment of the WP after the logical address space is allocated is ⌈CS/SS⌉ (the result of CS/SS is rounded up to an integer). The increment of WP also represents the increment of a logical address index for a next command after the logical address space is allocated for the command.

A physical address for an NVM is further allocated to the compressed data (CD1 and CD2). The size of the allocated physical address range needs to be large enough to hold the compressed data. For example, in the NVM, a storage space using the physical address indicated by the sPBA as the starting point and having a length of 16 KB is allocated to store compressed data CD1, and the next 4 KB storage space is allocated to store compressed data CD2. Those skilled in the art could know that the physical storage space for storing compressed data has other distribution modes, for example, located in different NVMs or different physical blocks. The starting address of the allocated logical address range and a corresponding physical address are recorded in an FTL table.

The compressed data (CD1 and CD2) is written to an NVM (416) indicated by the allocated physical address. The logical address index allocated in step 414 is further returned to the host (418) to notify the host of the logical address space allocated for the command (CMD1 or CMD2). The host can record the assigned logical address index to retrieve the corresponding data (D1 or D2) using the allocated logical address index in future. The host is also notified that processing of the command is completed.

It should be pointed out that according to the embodiments of the present application, data compression is transparent to the host. The host does not need additional processing to access the compressed data in the NVM. There is no need to modify the protocol used by the host to access the storage device. For the host, data D1 corresponding to command CMD1 is written into the logical address sLBA with a data length of 128 KB, and data D2 corresponding to command CMD2 is written into the logical address sLBA+32 with a data length of 60 KB. The host reads 128 KB of data from the logical address sLBA to obtain data D1, and the host reads 60 KB of data from the logical address sLBA+32 to obtain data D2.

Step 416 does not need to occur before step 418. The storage device can use a cache to record the data (CD1 and CD2) to be written into the NVM, and before data CD1 and/or CD2 is written into the NVM, notifies the host that the processing of the commands (CMD1 and CMD2) is completed. Optionally, the host provides an additional flush command to instruct the storage device to write the cached data (CD1 and CD2) into the NVM.

FIG. 4B is a schematic diagram of address space mapping according to an embodiment of the present application.

Referring also to FIG. 4A, after processing the commands CMD1 and CMD2, entries of the FTL table record the NVM address corresponding to the logical address index sLBA (i.e., sLBA+0) (the NVM address stores compressed data CD1, the size of which is 16 KB), and the entries of the FTL table also record the NVM address corresponding to the logical address index sLBA+32 (the NVM address stores compressed data CD2, the size of which is 4 KB). The entries of the FTL table also record an NVM address corresponding to a logical address index sLBA+40 (the NVM address stores compressed data CD2 corresponding to command CMD3 (not shown in FIG. 4B)).

The physical address space in FIG. 4B indicates data stored in an NVM, which is addressed by a physical address (i.e., an NVM address). Optionally, the NVM further provides an additional storage space to hold metadata of the data. The metadata includes, for example, the logical address of the corresponding data, the data length after compression, and/or the data length before compression. According to the data length after compression, it is possible to know data in what physical address range starting, for example, from an NVM address recorded in an FTL table entry is compressed data obtained from the same data.

The logical address space in FIG. 4B indicates data written or read by the host to/from the logical address index of the storage device. Data D1 occupies a 128 KB address space range in the logical address space, and data D2 occupies a 60 KB address space range in the logical address space. Data D1 in the logical address space corresponds to compressed data CD1 in the physical address space, data D2 in the logical address space corresponds to compressed data CD2 in the physical address space, and data D3 in the logical address space corresponds to compressed data CD3 in the physical address space. Therefore, according to the embodiments of the present application, data written by a user to a storage device occupies a logical address space with its original size, and occupies a physical address space with its compressed size.

It should be pointed out that according to the embodiments of the present application, the logical address space and the physical address space are not in a one-to-one correspondence. The size of the logical address space exceeds the size of the physical address space. The logical address space allocated for the data corresponding to each command is defined by two dimensions, i.e., the logical address space index (the starting address of the logical address space) and the size of the logical address space. Only the logical address space index is used as the index of the FTL table, and other logical addresses in the logical address space cannot be used as the index of the FTL table. Optionally, in some implementations, the location of an FTL table entry in the FTL table implies the logical address index corresponding to the entry, but some entries are not used or filled with valid NVM addresses because there are no corresponding logical address space indexes. For example, with reference to FIG. 4B, the FTL table entries corresponding to the logical address indexes sLBA+1 to sLBA+31 are not used or are not filled with valid NVM addresses.

Figure 5A:
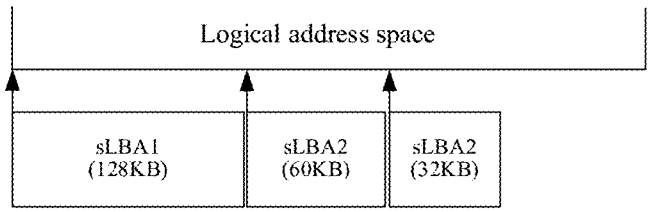
FIG. 5A is a schematic diagram of a logical address space in the prior art.

FIG. 5A is a schematic diagram of a logical address space in the prior art.

Figure 5B:
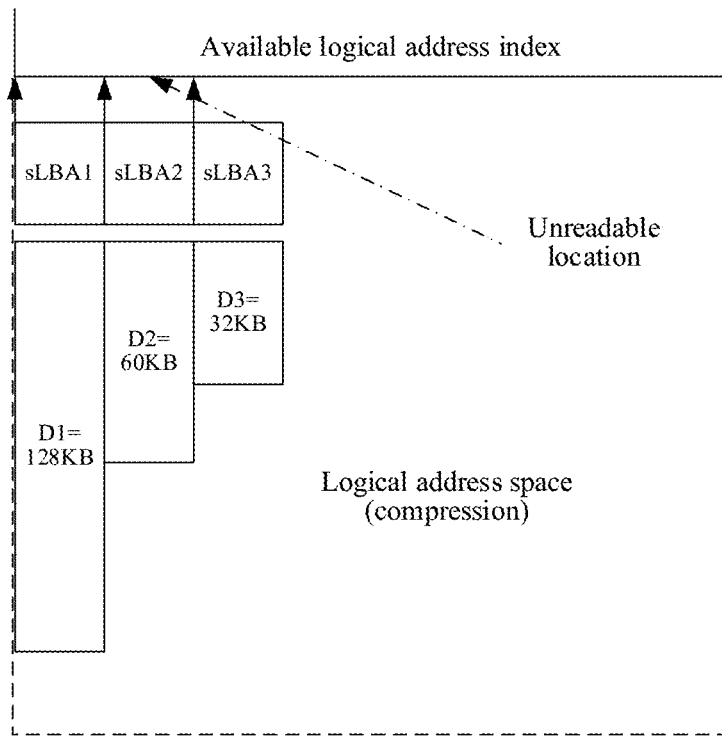
FIG. 5B is a schematic diagram of a logical address space according to an embodiment of the present application.

FIG. 5B is a schematic diagram of a logical address space according to an embodiment of the present application.

FIG. 5A and FIG. 5B show distributions, after three commands (CMD1, CMD2, and CMD3) are processed, of data written by each command in a logical address space in the prior art and a logical address space according to the embodiments of the present application. CMD1 indicates that the size of written data (D1) is 128 KB, CMD2 indicates that the size of written data (D2) is 60 KB, and CMD3 indicates that the size of written data (D3) is 32 KB. The three commands are processed in the order of CMD1, CMD2, and CMD3, and the starting addresses of the logical address spaces corresponding to the three commands are denoted as sLBA1, sLBA2, and sLBA3, respectively. The logical block size is 512 B. The starting address of the overall logical address space is sLBA.

With reference to FIG. 5A, according to the prior art, the logical address space is a one-dimensional space, and the distribution of data in the space is described by logical addresses. The data corresponding to command CMD1 occupies a range of logical addresses sLBA+0 to sLBA+255 (256 logical blocks) in the logical address space, and the starting address sLBA1=sLBA+0. The data corresponding to command CMD2 occupies a range of logical addresses sLBA+256 to sLBA+315 (120 logical blocks) in the logical address space, and the starting address sLBA2=sLBA+256. The data corresponding to command CMD3 occupies a range of logical addresses sLBA+316 to sLBA+379 (64 logical blocks) in the logical address space, and the starting address sLBA3=sLBA+316.

With reference to FIG. 5B, for the same three commands (CMD1, CMD2, and CMD3), according to the embodiments of the present application, the logical address space is a two-dimensional space, the logical address space holding the data corresponding to each command is expressed by two dimensions, one dimension is the logical address index of the logical address space, and the other dimension is the size of the logical address space. Since the logical address index and the size of the logical address space are two (orthogonal) dimensions, the two dimensions are not additable, and the result of the addition of numerical values of the two dimensions cannot be used for addressing in the logical address space. The logical address space occupied by the data corresponding to command CMD1 is represented by <logical address index sLBA+0, 128 KB>, and the logical address space occupied by the data corresponding to command CMD2 is represented by <logical address index sLBA+32, 60 KB>. In the logical address space, the data corresponding to each command starts from the location described by the logical address index and extends in the direction described by the logical address space size dimension, instead of extending toward the next element in the logical address index dimension.

According to the embodiments of the present application, values of elements in the logical address index dimension of the logical address space do not need to be consecutive. In the example of FIG. 5B, the first element in the logical address index dimension of the logical address space is sLBA+0, the second element is sLBA+32, and the third element is sLBA+40. Other values such as sLBA+1 to sLBA+31 are not elements in the logical address index dimension, do not have corresponding elements in the logical address space size dimension, and cannot be used to read data.

In one implementation, in the logical address index dimension of the logical address space, the numerical value difference between adjacent elements (for example, 32=sLBA2−sLBA1) represents the number of logical blocks occupied by data corresponding to the former element in the pair of adjacent elements after compression (for example, 32 represents 32 logical blocks). The numerical value of each element is the sum of the numbers of logical blocks occupied by data corresponding to all elements before the element after compression. Thus, the value of a logical address index can be used to index an FTL table in the prior art, and the FTL in the prior art can be used to map the logical address index according to the embodiments of the present application to a physical address. No results for values (such as sLBA+1 to sLBA+31) that are not used by the logical address index can be queried in the FTL table, or the values are marked as corresponding to specified values such as "null".

In another implementation, the value of the logical address index is not used as a numerical value, but as an index such as a "key", and an FTL obtains a corresponding physical address by mapping the "key" to "value".

Referring again to the respective charts in FIG. 5A and FIG. 5B, in both implementations, for the processed three commands, the host records the starting address and data length of the logical address space (sLBA1, sLBA2 and sLBA3) corresponding to each command (CMD1, CMD2, and CMD3). Therefore, in the two implementations, operations implemented by the host are the same in form (only the values of the starting addresses are different, and the values come from parameters returned by the storage device, without the need for calculation by the host). Therefore, according to the embodiments of the present application, data compression is provided in a transparent manner to the host without requiring the host to introduce an additional operation.

Figure 6A:
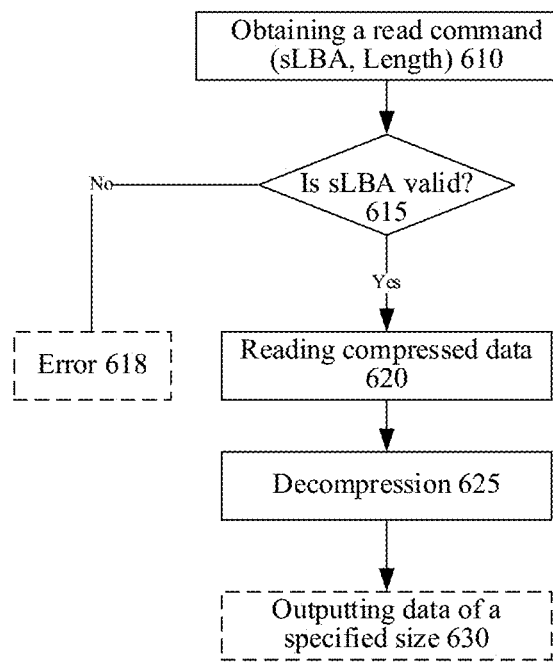
FIG. 6A is a flowchart of reading compressed data according to an embodiment of the present application.

FIG. 6A is a flowchart of reading compressed data according to an embodiment of the present application.

A host sends a read command to a storage device to retrieve data written to the storage device (610). The read command indicates, for example, two parameters, namely, the starting address (denoted as sLBA) and length of the data to be read. The starting address sLBA in the read command is a starting address of a logical address space storing written data, the starting address of the logical address space being maintained by the host, received from the storage device, returned in response to a write command sent by the host before. According to the embodiments of the present application, the starting address returned by the storage device is a logical address index, and the host regards it as the starting address of the logical address space, so that the host does not need to change the way of processing the starting address in the prior art.

In response to receiving the read command, the starting address sLBA and length are extracted from the read command, and the storage device checks whether the starting address sLBA is a valid logical address index (615), for example, looking up an FTL table to identify whether the obtained sLBA is a valid logical address index. A valid logical address index is recorded in the FTL table. Whereas, if there is no record in the FTL table, or the FTL table indicates that a physical address corresponding to the logical address index is a designated value such as null, it is identified that the obtained sLBA is not a valid logical address index. In response to the sLBA being not a valid logical address index (615), the storage device indicates to the host that there is an error in the read command (618).

In response to the obtained sLBA being a valid logical address index (615), compressed data stored in an NVM corresponding to the sLBA is obtained (620). For example, the FTL table is accessed according to the sLBA to obtain a corresponding physical address, and an NVM is accessed according to the physical address to read data, and the data read is compressed data. Optionally, in order to read data from the NVM, the length of the compressed data also needs to be obtained, because according to the embodiments of the present application, the physical address spaces corresponding to entries of the FTL table have variable sizes (referring also to FIG. 4B, the size of compressed data CD1 is 16 KB, and the size of compressed data CD2 is 4 KB). In one example, the length information is obtained from a designated location (for example, the front or out-of-band zone) of a zone indicated by the physical address, and the length information indicates the number of sectors of the compressed data to be read in the physical address space. It can be understood that when writing the data to the NVM, the length information is also written to the NVM. In another example, the FTL table is searched for a next valid logical address index (denoted as sLBA+a) after the logical address index sLBA obtained in step 610, and the difference (a) between the two logical address indexes corresponds to the number of sectors of the compressed data in the physical address space. For example, referring also to FIG. 5B, the logical address index corresponding to CMD1 is sLBA1, in the FTL table, the next valid logical address index after sLBA1 is sLBA2, and the difference 32 between sLBA2 and sLBA1 represents the number (32) of sectors, in the physical address space, of data corresponding to CMD1 after compression. In still another example, compressed data of one or more sectors is read starting from the physical address corresponding to the sLBA, until it is identified (for example, according to an end sign or the fact that decompression can succeed) that all compressed data corresponding to uncompressed data is read. The compressed data obtained in step 620 is decompressed (625).

In still another example, the compressed data stored in the NVM is compressed in segments. For example, in the compression process, multiple compressed packages are formed, each compressed package does not exceed the size of one sector and can be decompressed independently, and the multiple compressed packages are stored in consecutive sectors. Correspondingly, compressed data in one sector is read starting from the physical address corresponding to the sLBA, the compressed data is decompressed (625), and whether the decompressed data has a length consistent with the length obtained from the read command in step 610 is determined by comparison. If the decompressed data has a length smaller than the length indicated by the read command, a next sector is read from the next location of the physical address corresponding to the sLBA, the compressed data in the sector is decompressed (625), and whether the accumulated decompressed data length reaches the length obtained from the read command is identified. If the length of the data to be read indicated by the read command is still not reached, the above process is repeated to read compressed data from one or more other sectors and the compressed data is decompressed (625), until the accumulated decompressed data length reaches the length of the data to be read.

It should be pointed out that the length of the data to be read by the read command (the length obtained in step 610, denoted as L) may be different from the length of the data written by the previous write command. For example, referring also to FIG. 5B, the length of the data written by command CMD1 is 128 KB, and the corresponding logical address index is sLBA1. The read command provided by the host can indicate the logical address sLBA1, but the length is, for example, 58 KB. The length of the data to be read indicated in the read command is the length of data starting from the starting address sLBA indicated by the read command. Therefore, in step 630, data, having a length of L (for example, 50 KB) from the beginning, of the decompressed data is provided to the host as a processing result of the read command.

Figure 6B:
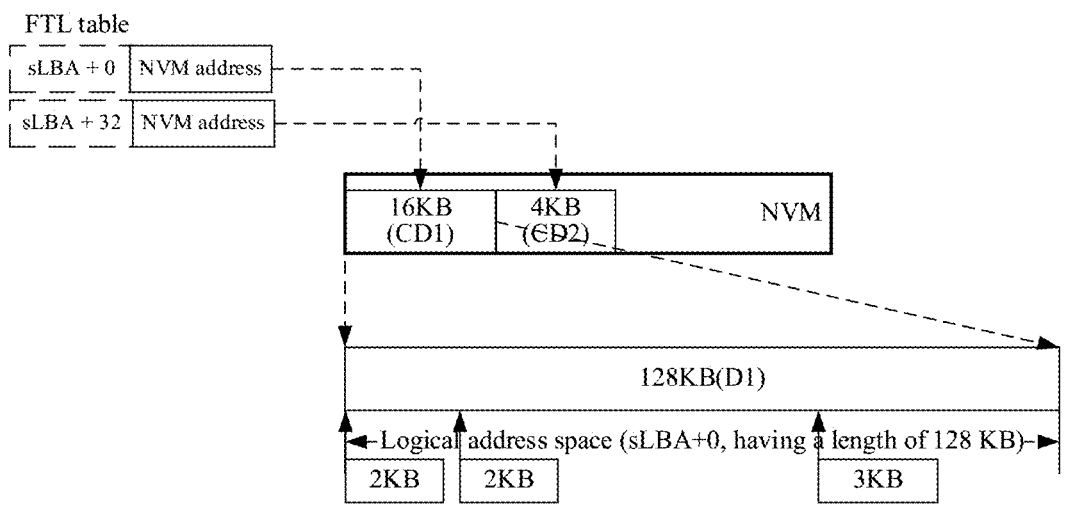
FIG. 6B is a schematic diagram of reading compressed data according to another embodiment of the present application.
Figure 6B:
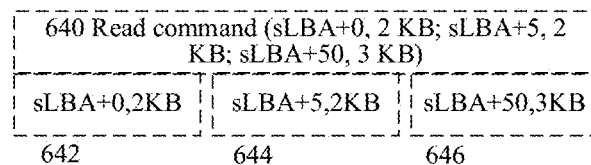

Some read commands provided by the host to the storage device have different formats. For example, the read command does not carry length information, but implies the length of data to be read, for example, data with a fixed length needs to be read by each read command. In other cases, the read command indicates that multiple pieces of discontinuous data should be read. FIG. 6B shows a way of processing such a read command.

FIG. 6B is a schematic diagram of reading compressed data according to another embodiment of the present application.

As an example, a read command 640 instructs to read data having a length of 2 KB from a logical address sLBA+0, read data having a length of 2 KB from a logical address sLBA+5, and read 3 KB data from a logical address sLBA+50. Each logical block has a size of, for example, 512 B.

An FTL table records logical address indexes (sLBA+0 and sLBA+32), and also records a physical address of an NVM corresponding to each logical address index. Compressed data respectively corresponding to the two logical address indexes (compressed data CD1 having a size of 16 KB and compressed data CD2 having a size of 4 KB) are stored in the NVM. Data before compression corresponding to compressed data CD1 is 128 KB, and is represented by <sLBA+0, 128 KB> in the logical address space according to the embodiments of the present application.

The read command 640 indicates 3 addresses from which data is to be read, respectively denoted as <sLBA+0, 2 KB> (642), <sLBA+5, 2 KB> (644) and <sLBA+50, 3 KB> (646). According to the embodiments of the present application, for a first address <sLBA+0, 2 KB> (642) in multiple addresses to be read by the read command 640, the address sLBA+0 indicated by the same is used as a logical address index, and the logical address index is used to access an FTL table to obtain a physical address of compressed data CD1. Other addresses to be read by the read command 640 are not used as logical address indexes.

With reference to FIG. 6B, compressed data CD1 is read and decompressed to obtain data D1 corresponding to the logical address space <sLBA+0, 128 KB>.

The multiple addresses <sLBA+0, 2 KB> (642), <sLBA+5, 2 KB> (644) and <sLBA+50, 3 KB> (646) to be read by the read command 640 are linearly mapped to the logical address space size dimension of the logical address space <sLBA+0, 128 KB> of data D1 according to the relative location and length of the addresses relative to the starting address of data D1 in the logical address space. As an example, the three addresses <sLBA+0, 2 KB> (642), <sLBA+5, 2 KB> (644), and <sLBA+50, 3 KB> (646) respectively correspond to data ranging from 0 to 2 KB, 2 KB data starting from 2.5 KB, and 3 KB data starting from 25 KB in the logical address space size dimension. The data in these ranges is obtained from data D1 and provided to the host as a processing result of the read command 640.

Figure 6C:
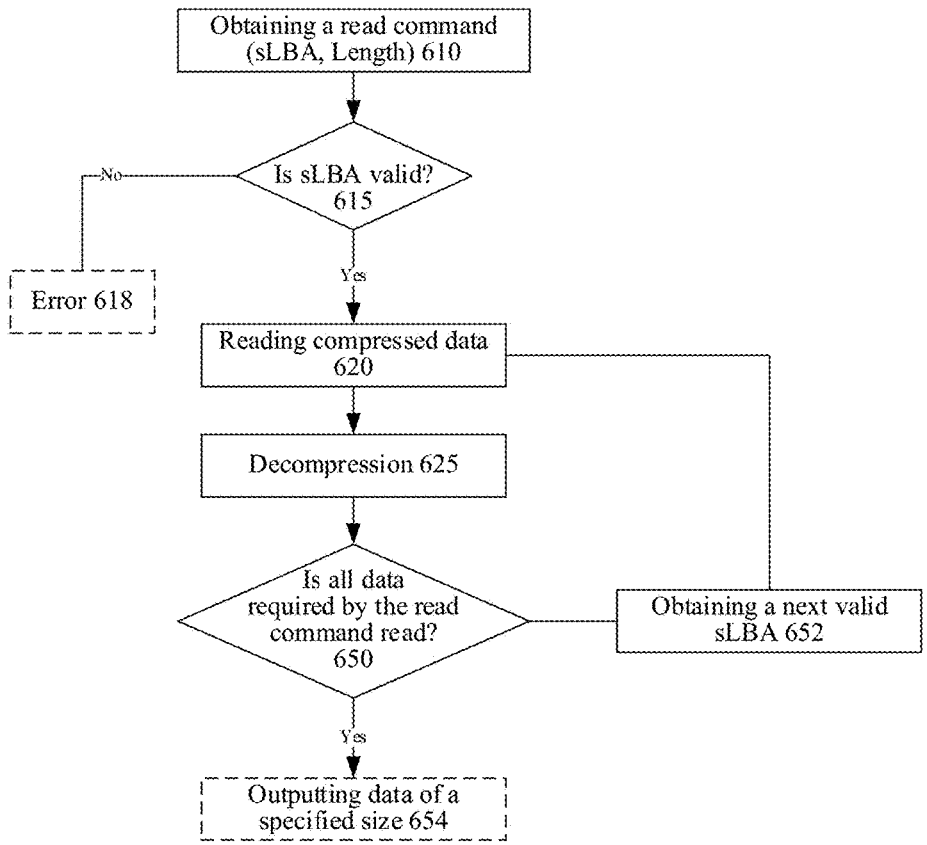
FIG. 6C is a flowchart of reading compressed data according to still another embodiment of the present application.

FIG. 6C is a flowchart of reading compressed data according to still another embodiment of the present application.

The embodiment shown in FIG. 6C has the same multiple steps (610, 615, 618, 620, 625) as the embodiment shown in FIG. 6A.

In the embodiment according to FIG. 6C, after all the data read according to the starting address sLBA as the logical address index is decompressed in step 625, it is further determined whether the size of the decompressed data meets the data length (L) required by the read command in step 610

(650). If the size of the decompressed data exceeds the data length (L), in step 654, data, having a length of L from the beginning, of the decompressed data is provided to the host as a processing result of the read command. In step 650, if the size of the decompressed data is still smaller than the data length (L), the FTL table is searched for a next valid logical address index after the logical address index sLBA obtained in step 610 (denoted as sLBA+a) (652). Returning to step 620, according to the next valid logical address index (sLBA+a), compressed data stored in the NVM corresponding to sLBA+a is obtained. Then, processing is continued through step 625 and subsequent steps, until it is identified in step 650 that the accumulated decompressed data length of compressed data read multiple times is not smaller than the length (L) of data to be read, and data having a length L is output to the host through step 654 as a response to the read command in step 610.

Figure 6D:
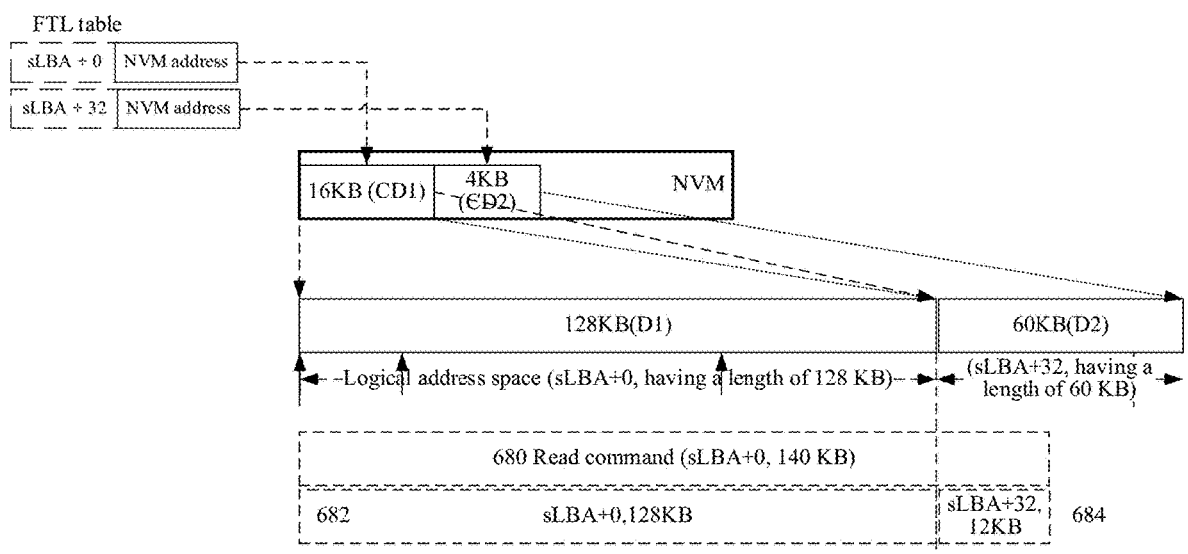
FIG. 6D is a schematic diagram of reading compressed data according to still another embodiment of the present application.

FIG. 6D is a schematic diagram of reading compressed data according to still another embodiment of the present application.

As an example, a read command 680 instructs to read data having a length of 140 KB from a logical address sLBA+0. Each logical block has a size of, for example, 512 B.

The same as the situation shown in FIG. 6B, an FTL table records logical address indexes (sLBA+0 and sLBA+32), and also records a physical address of an NVM corresponding to each logical address index. Compressed data respectively corresponding to the two logical address indexes (compressed data CD1 having a size of 16 KB and compressed data CD2 having a size of 4 KB) are stored in the NVM. Data before compression corresponding to compressed data CD1 is 128 KB, and is represented by the logical address space <sLBA+0, 128 KB> according to the embodiments of the present application. Data before compression corresponding to compressed data CD2 is 60 KB, and is represented by the logical address space <sLBA+32, 60 KB> according to the embodiments of the present application.

The size (140 KB) of data to be read by the read command 680 exceeds the decompressed data size (128 KB) corresponding to the logical address index sLBA+0. Therefore, according to the embodiments of the present application, a logical address index (sLBA+32) next to the logical address index sLBA+0 in the FTL table continues to provide data for the read command 680. The decompressed data size corresponding to the logical address indexes sLBA+0 and sLBA+32 is 188 KB, which meets the requirement for the data to be read by the read command 680. Therefore, the read command 680 corresponds to two read commands, which are respectively denoted as a read command (682) for accessing the logical address space <sLBA+0, 128 KB> and a read command (684) for accessing the logical address space <sLBA+32, 12 KB>. Understandably, referring also to FIG. 6C, when the read command 680 is processed, the read command (682) is processed through step 620 and step 625; in step 650, it is identified that not all the data required for the read command 680 is obtained, and processing of the read command (684) is continued. The 128 KB data read by the read command 682 and the 12 KB data read by the read command 684 are combined as a response to the read command 680.

Due to compression, the logical address space provided by the storage device is expanded.

When the host accesses a ZNS following an NVMe protocol, each zone provides, to the host, a logical address space to which data can be written sequentially, and the host maintains the starting address of the logical address space returned by the ZNS for each command. According to the embodiments of the present application, the host does not need to perform an additional operation, and a ZNS having a compression capability (referred to as a compressed ZNS) is provided to the host in a transparent manner. According to the embodiments of the present application, in order to provide a compressed ZNS, a command (a write command or an append command) provided by the host to the compressed ZNS is processed by the ways provided according to, for example, the embodiments shown in FIG. 4A and FIG. 4B, and an allocated logical address index returned by the host is used as the starting address of a logical address space for the command. A logical address space of a two-dimensional structure according to the embodiments of the present application is used as a logical address space of the zone displayed to the host. However, the host does not need to realize that the logical address space provided by the embodiments of the present application has two dimensions, but retrieves data written to the storage device according to the starting address and data length by a way of accessing a one-dimensional logical address space or the like in the prior art. Referring also to FIG. 5B, the host writes data D1 to a logical address space of the storage device starting from sLBA+0 and having a length of 128 KB, writes data D2 to a logical address space of the storage device starting from sLBA+32 and having a length of 60 KB, and writes data D3 to a logical address space of the storage device starting from sLBA+40 and having a length of 32 KB. Although, if the host calculates the difference between the starting address of the logical address spaces where data D1 and D2 are stored, it will find that the two starting addresses are only 32 logical blocks apart, and will be confused as to why the 32 logical blocks can hold 128 KB of data, but this does not affect the host's access to data written to the ZNS of the storage device. Moreover, the host can know that the data in the ZNS is compressed.

Figure 7:
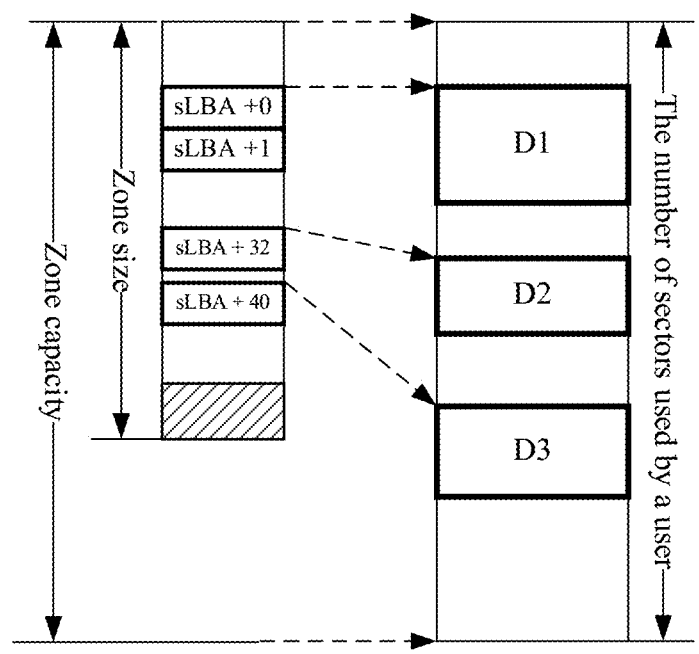
FIG. 7 is a schematic diagram of a zone capacity of a compressed ZNS according to an embodiment of the present application.

FIG. 7 is a schematic diagram of a zone capacity of a compressed ZNS according to an embodiment of the present application.

According to the NVMe protocol, ZNS has attributes including zone size and zone capacity. The value of the zone size represents the number of logical blocks in the zone, and the value of the zone capacity represents the maximum number of logical blocks to which user data can be written when the zone is empty. Zone capacity is an important parameter for the host to manage the zone. For example, the host determines, according to the zone capacity or the proportion of invalid data amount of the zone in the zone capacity, the time to reset or reclaim the zone and/or selection of the zone to be reclaimed. Zone capacity also affects selection of a zone management strategy by the host.

According to the embodiments of the present application, the zone size provided by the storage device to the host is, for example, the number of available logical address indexes, and the zone capacity is the sum of the sizes (indicated by, for example, the number of logical blocks) of logical address spaces allocated to data after the zone is full. Because the data is compressed, the value of the zone capacity can exceed the zone size.

FIG. 7 shows a zone according to embodiments of the present application. The number of available logical address indexes in the zone is m (respectively denoted as sLBA0, sLBA1, ..., and sLBA(m−1)), and logical address spaces are allocated to the logical address indexes (sLBA0, sLBA32, and sLBA40) to hold data (D1, D2 and D3), respectively. The zone size attribute value of the zone is m. Optionally, the available logical address indexes include an unused logical address index. Thus, for the zone shown in FIG. 7, the number of logical address indexes that can be used to index an FTL table can be less than m. For example, in FIG. 7, the logical address index sLBA+1 cannot be used to index the FTL table, and is not a valid logical address index.

As an example, an array of a flat structure is used to hold the FTL table of the ZNS. When the ZNS is created, the zone size m is specified to determine that, in the FTL table, m elements are reserved for each zone of the created ZNS to hold logical address indexes (respectively corresponding to sLBA0, sLBA1, . . . , and sLBA(m−1)), and the m elements are initialized to a specified value or null to indicate that the elements are not yet valid logical address indexes.

In response to processing a command for writing data to a certain zone of the ZNS, a physical address of an NVM holding compressed data corresponding to the command is recorded in an FTL table element corresponding to a logical address index (denoted as sLBA_i) allocated for the command. The (uncompressed) size of data (denoted as Di) to be written by the command is denoted as data_length(sLBA_i). If the size of compressed data (denoted as CDi) obtained after data Di is compressed is denoted as CSi, and the logical block size is denoted as SS, a next valid logical address index of the zone is sLBA_i+⌈CS/SS⌉, and logical address indexes in a range from sLBA_i+1 to sLBA_i+⌈CS/SS⌉−1 are not valid logical address indexes. The logical address space size corresponding to an invalid logical address index (for example, sLBA_j) is 0 (data_length(sLBA_j)=0). Thus, the zone capacity of the zone is $\Sigma_{sLBA\_i=0}^{sLBA\_(m-1)}$ data_length(sLBA_i), and also equal to the number of sectors occupied by all user data written by the host to the zone. As data is written to the zone, the zone capacity increases accordingly, and when the zone is full, the zone capacity reaches the maximum value and does not change before the zone is reset or reclaimed.

Since the zone capacity is equal to the number of sectors occupied by all user data written by the host to the zone, elements (such as sectors) of the address space of the zone maintained by the host are in one-to-one correspondence to logical blocks of the logical address space provided by the storage device for the zone. Moreover, addresses that the host can use in a read command for accessing the zone are in one-to-one correspondence to valid logical address indexes of the storage device for the zone, and the valid logical addresses can be used to index entries of an FTL table. The zone capacity is divided by the zone size to obtain the data compression rate of the zone. The data compression rate of the zone can be greater than 1.

Figure 8:
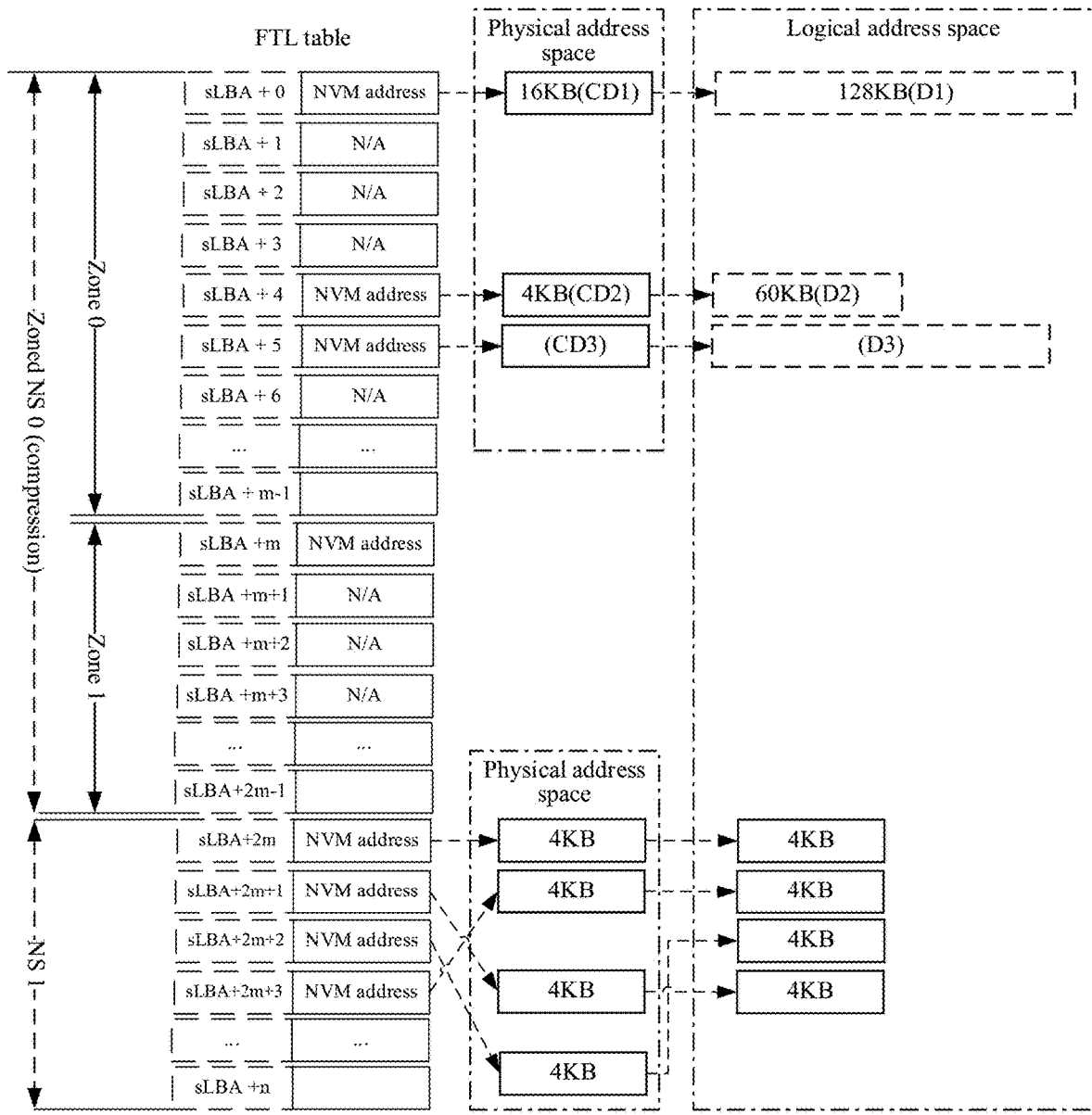
FIG. 8 is a schematic diagram of a storage device providing a hybrid NS according to an embodiment of the present application.

FIG. 8 is a schematic diagram of a storage device providing a hybrid NS according to an embodiment of the present application.

A NVMe protocol defines an NS. The NS may be regarded as a logical storage device. A storage device can provide multiple NSs at the same time.

With reference to FIG. 8, the storage device provides NSs (NS0 and NS1). The NS0 is a compressed ZNS according to the embodiments of the present application, as an example, it includes Zone0 and Zone1. The NS1 is a NS according to the prior art.

As an example, an FTL table is an array of a flat structure, so indexes of FTL table entries is the storage locations thereof in a memory. The FTL table provides m entries for Zone0 and Zone1 each. Therefore, the zone size of Zone0 and Zone1 is m. The FTL table provides n−2m−1 entries for NS1, and each entry corresponds to, for example, a logical address space having a size of 4 KB, so the capacity of NS1 is 4K*(n−2m−1).

Zone0 and Zone1 are capable of compression, and the indexes of the FTL table entries for Zone0 or Zone1 are logical address indexes for Zone0 or Zone1. In FIG. 8, taking Zone0 as an example, FTL table entries indexed by sLBA+0, sLBA+4, and sLBA+5 record valid NVM addresses, and therefore, sLBA+0, sLBA+4, and sLBA+5 are valid logical address indexes, but logical address indexes such as sLBA+1 to sLBA+3 are not valid. For Zone0, each entry in the FTL table corresponds to, for example, a physical storage space having a size of 4 KB. A physical address space corresponding to the logical address index sLBA+0 stores part of compressed data CD1. Since compressed data CD1 is 16 KB in size, it occupies four consecutive 4 KB physical address spaces, and the four 4 KB physical address spaces correspond to four logical address indexes (FTL table entries) from sLBA+0 to sLBA+3. However, compressed data CD1 is only indexed by the logical address index sLBA+0. Thus, logical address indexes from sLBA+1 to sLBA+3 are not available, and these logical address indexes are marked as unavailable by setting null or designated values in the FTL table entries corresponding to these indexes. Thus, the host can only access compressed data CD1 through the logical address index sLBA+0, but cannot access compressed data CD1 through the logical address indexes sLBA+1 to sLBA+3.

Therefore, in the ZNS, the size of the compressed data corresponding to the valid logical address index also determines the location of the next valid logical address index in the FTL table. In Zone0 in FIG. 8, the logical address index sLBA+0 indexes compressed data CD1 of 16 KB, so that the next valid logical address index is sLBA+4, which indexes compressed data CD2 of 4 KB, and the next valid logical address index is sLBA+5, which indexes compressed data CD3.

In the ZNS, compressed data is stored in the physical address space, and for the host or user, uncompressed data is held in the logical address space. The host can obtain the uncompressed data according to the starting address and data length of the logical address space by a way in the prior art. Therefore, although stored data is compressed in NS0, the host does not need an additional adjustment to access the compressed data. Therefore, the ZNS according to the embodiments of the present application is transparent to the host. The logical space corresponding to compressed data CD1 holds data D1 (128 KB in size). The logical space corresponding to compressed data CD2 holds data D2 (60 KB in size). The logical space corresponding to compressed data CD3 holds data D3.

Upon comparison, physical address spaces and logical address spaces of NS1 are in one-to-one correspondence, and a 4 KB area of the physical address space corresponds to a 4 KB area of the logical address space. The logical address spaces of NS1 are defined by logical address ranges, that is, defined by the indexes of the FTL table entries, so that the logical address spaces of NS1 extend from sLBA+2m to sLBA+n. A user accessing the logical address spaces (for example, sLBA+2m to sLBA+n) of NS1 will obtain data in the logical address spaces corresponding to FTL table entries indexed by the logical addresses sLBA+2m to sLBA+n. The logical address spaces of NS0 do not extend from logical addresses sLBA0 to sLBA+2m−1, but are a combination of logical address spaces corresponding to all valid logical address indexes from sLBA+0 to sLBA+2m−1. Thus, a user accessing the logical address spaces of NS0 (for example, sLBA0 to sLBA+2m−1) will obtain the logical address space for holding data D1, the logical address space for holding data D2, the logical address space for holding data D3, . . . , and the logical address space corresponding to the last valid logical address index from sLBA+0 to sLBA+2m−1. Therefore, as an example, if the capacity of NS0 is C0, and the host sends a read command indicating a starting address sLBA0 and a size C0, when processing the command, data D1 is read starting from sLBA+0 as the logical address index, then a next valid logical address index (sLBA+4) is obtained from the entries for NS0 in the FTL table and data D2 corresponding to the valid logical address is obtained, and so on, until the last valid logical address index in the entries for NS0 in the FTL table is obtained and data corresponding thereto is obtained. The sum of the lengths of all the data is C0. It can be understood that after obtaining data D1 or compressed data CD1 according to the valid logical address index sLBA+0, the location of a next valid logical address index in the FTL table can be determined according to the size of compressed data CD1, and the increment of the location of the next valid logical address index relative to the location of the current valid logical address index is [CS1/SS], where CS1 is the size of compressed data CD1, and SS is the logical block size. Optionally, the FTL table is traversed starting from the current valid logical address index (for example, sLBA+0), and the valid logical address index can also be identified according to the value of the FTL table entry.

Therefore, according to the embodiments of the present application, the storage device provides multiple NSs having different attributes. For example, NS0 has high storage capacity or high density (because of the implementation of data compression) (compared with NS1), and NS1 has high performance and better Quality of Service (QoS) (compared with NS0). A user can record data in different NSs according to needs.

Figure 9:
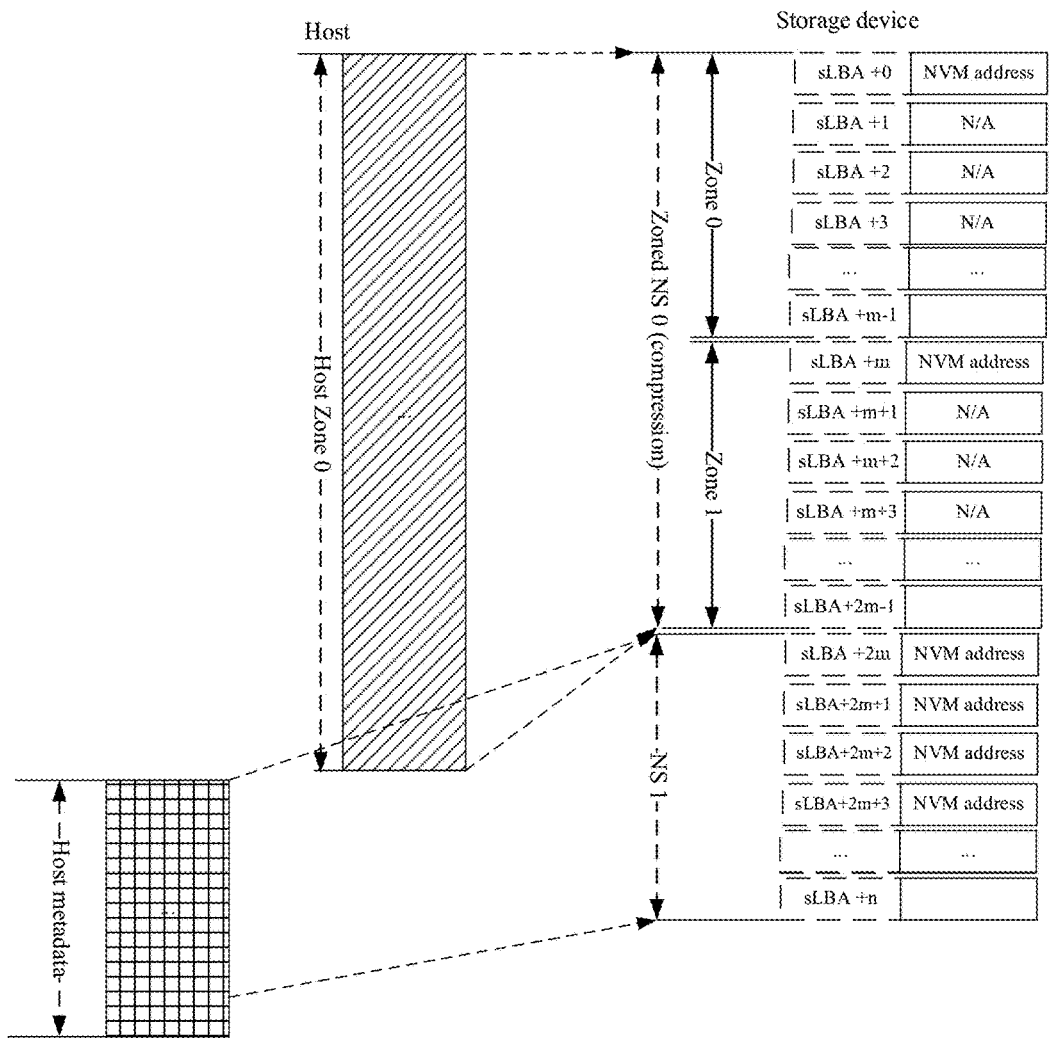
FIG. 9 is a schematic diagram of using a hybrid NS according to an embodiment of the present application.

FIG. 9 is a schematic diagram of using a hybrid NS according to an embodiment of the present application.

The creation, use, and recycling of a zone require to be managed by a host. The host also needs to ensure that data written to the zone is written in order of addresses, because the zone does not support random writing. Moreover, some scenes or data need to be written randomly, for example, zone capacity. Zone capacity is metadata describing the zone. In the process of writing data to the zone according to the embodiments of the present application, the zone capacity may change along with data writing, and metadata such as the zone capacity can be better updated by using a random writing method.

With reference to FIG. 9, an NS0 provided by a storage device is a compressed ZNS, and the host creates and uses a zone (denoted as host Zone0) in the NS. A NS1 of the storage device is an NS that supports random writing, and the host records metadata for the host Zone0 in the NS1. Thus, the high storage density of the NS0 and the better performance of the NS1 are fully used.

Referring also to FIG. 9, a host Zone 0 is further provided according to the embodiments of the present application. The hose Zone 0 is also capable of compression. As an example, the host Zone0 managed by the host is mapped to two zones (Zone0 and Zone1) of the storage device. According to application needs, the desired zone capacity of the host may be different from the zone capacity provided by the storage device. The host can combine two or more zones of the storage device into a single host zone. When a single host zone is created or recycled, all zones of the storage device that provide the host zone are created or recycled together.

To provide a host zone, the host further manages the mapping from the host zone to the storage device zone. In the example of FIG. 9, the logical address index range used by the host Zone0 is all the available logical address indexes of Zone0 and Zone1 of the storage device (sLBA+0 to sLBA+2m−1). Therefore, according to the logical address index for accessing the host Zone0, it is determined which zone of the storage device the logical address index is provided by, and the zone of the storage device is accessed by using the logical address index according to the foregoing embodiments of the present application.

Figure 10A:
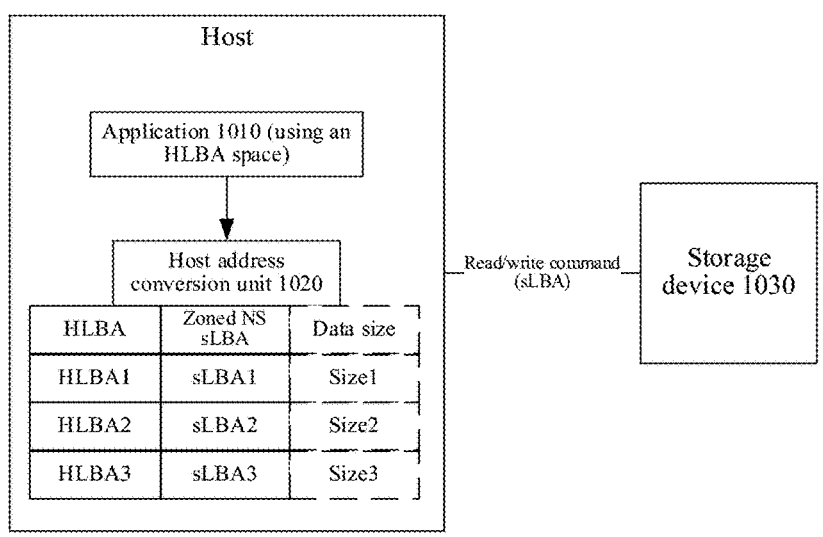
FIG. 10A is a schematic diagram of a host using a compressed ZNS according to an embodiment of the present application.

FIG. 10A is a schematic diagram of a host using a compressed ZNS according to an embodiment of the present application.

The host is coupled with a storage device according to the embodiments of the present application. A storage device 1030 according to the embodiments of the present application provides a compressed ZNS.

An application 1010 runs in the host, and the application 1010 accesses the storage device according to the embodiments of the present application by using a host logical address space. An element of the host logical address space is called a host logical address (denoted as HLBA). The host logical address is the same as a logical address used to access a storage device such as a hard disk in the prior art such as a Linux operating system and a Windows operating system. Optionally, the application 1010 uses a host logical address and a host logical address space in a manner in the prior art, but the host logical address and the host logical address space provided by the host to the application 1010 according to the embodiments of the present application are different from the prior art.

According to the embodiments of the present application, the host further includes a host address conversion unit 1020. The host address conversion unit 1020 converts the host logical address into a logical address index (sLBA) for a ZNS according to the embodiments of the present application. As an example, the host address conversion unit 1020 maintains the mapping between the host logical address (HLBA) and the logical address index (sLBA). For example, the host address conversion unit 1020 includes a host FTL table, and an entry in the host FTL table records the mapping between the host logical address (HLBA) and the logical address index (sLBA). Optionally, the entry of the host FTL table further records the size of a logical address space corresponding to the logical address index (sLBA) (which is also the size of data written to the logical address index (sLBA)).

The host accesses the storage device 1030 by sending, for example, a read command, a write command, or an append command to the storage device 1030. As an example, the read command and the write command indicate a logical address index (sLBA), and the append command implies that the storage device 1030 provides a logical address index (sLBA) used for carrying written data. Optionally, in response to processing the write command and/or append command, the storage device 1030 further returns to the host the logical address index (sLBA) of the logical address space carrying the written data. Optionally, the storage device 1030 further indicates the next available logical address index (sLBA) to the host, so that the host can update the WP to the next available logical address index (sLBA). As an example, the append command only indicates the zone number (as part of the logical address index (sLBA)), and in response to processing the append command, the storage device 1030 indicates to the host the logical address index (sLBA) of the logical address space carrying the written data. In one example, the write command indicates the complete logical address index (sLBA) including the zone number, and the storage device 1030 indicates the next available logical address index (sLBA) to the host in response to processing the write command, and optionally indicates the logical address index (sLBA) of the logical address space carrying the written data, where the logical address index (sLBA) of the logical address space carrying the written data may be the same as the logical address index indicated by the write command.

Figure 10B:
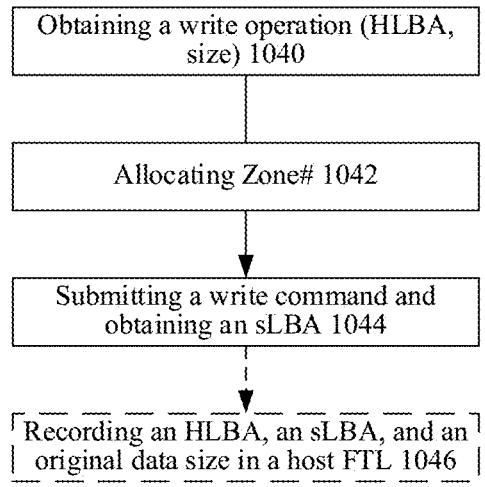
FIG. 10B and FIG. 10C are flowcharts of a host using a compressed ZNS according to embodiments of the present application.
Figure 10C:
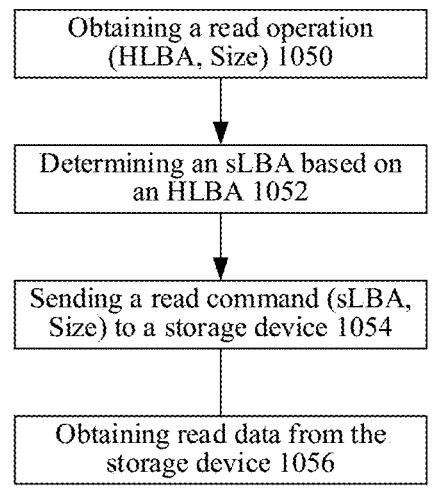

FIG. 10B and FIG. 10C are flowcharts of a host using a compressed ZNS according to embodiments of the present application.

With reference to FIG. 10B, the host writes data to the storage device 1030. The process shown in FIG. 10B is executed by a driver, a file system, and/or an operating system memory, etc. of the host. In order to write data to the host logical address space, the application 1010 indicates a write operation, where the host logical address (HLBA) and data to be written are indicated, and the data to be written has a size (denoted as size). A write operation 1040 is obtained. The host address conversion unit (1020), for example, allocates a zone (1042) for the obtained write operation. A zone number (denoted as Zone #), for example, represents the allocated zone. Optionally, a zone that can hold data to be written is allocated according to the data size corresponding to the write operation and the zone capacity. It can be understood that if the currently allocated zone still has capacity to hold the data to be written, there is no need to allocate a new zone. For a write command, a logical address index for the allocated zone is also obtained. According to the allocated zone, the write command or the append command is submitted to the storage device 1030, and optionally, the logical address index (sLBA) returned by the storage device 103 for the write command/append command is further obtained (1044). The host address conversion unit (1020) records, in the host FTL table, the host logical address (HLBA) obtained in step 1040 and the logical address index (sLBA) corresponding to the write operation (1046), so that the logical address index (sLBA) can be obtained by searching the host FTL table by the host logical address (HLBA). For example, if a write command is provided to the storage device 1030 in step 1044, a logical address index (sLBA) and a host logical address (HLBA) indicated by the write command are recorded in the host FTL table. For another example, if an append command is provided to the storage device 1030 in step 1044, a logical address index (sLBA) and a host logical address (HLBA) given as response by the storage device are recorded in the host FTL table. Optionally, in the host FTL table, the size of the data written to the logical address index (sLBA) is further recorded in association with the host logical address (HLBA) and the logical address index (sLBA). The size of the written data recorded in the host FTL table is not necessary.

Still optionally, for a write command, the storage device 1030 also returns a logical address index (sLBA) to indicate the completion of processing of the write command, and according to the returned logical address index (sLBA), the host determines a logical address index (sLBA) used for the next write command for the same zone. For a newly allocated zone, when data is written to the zone for the first time, the logical address index indicated by the write command is a specified value (for example, zone #and value 0).

With reference to FIG. 10C, the host reads data from the storage device 1030. The process shown in FIG. 10C is executed by a driver, a file system, and/or an operating system memory, etc. of the host. In order to read data from the host logical address space, the application 1010 indicates a read operation, in which a host logical address (HLBA) and the size of data to be read are indicated. A read operation 1050 is obtained. The host address conversion unit 1020 queries the host FTL table through the host logical address (HLBA) indicated by the read operation and obtains a corresponding logical address index (sLBA) (1052). Optionally, if no corresponding logical address index (sLBA) can be obtained through the host FTL table, it indicates that there is an error in the read command and a wrong host logical address HLBA is accessed.

According to the obtained logical address index (sLBA) and the size of data to be read, the read command is submitted to the storage device 1030 (1054). Data to be read by the read command is read from the storage device 1030 (1056).

Returning to step 1052, still optionally, if an entry in the host FTL table records a data size corresponding to the logical address index (sLBA), a mapping can be established between the linear host logical address space and a two-dimensional logical address space provided by a zone of a compressed ZNS of the storage device 1030, by means of the data size recorded in the entry in the host FTL table. For example, logical address spaces indicated by all logical address indexes (sLBA) are sorted according to the sizes of the logical address indexes (sLBA), and sequentially correspond to spaces having the same sizes as logical address spaces indicated by the logical address indexes (sLBA) in the host logical address space.

Therefore, in step 1052, for a certain host logical address (HLBA), if no corresponding logical address index (sLBA) is recorded in the host FTL table, the host logical address (HLBA) is mapped to a two-dimensional logical address space of the ZNS capable of compression by the location of the host logical address (HLBA) in the host logical address space, and a logical address index (sLBA) corresponding to the two-dimensional logical address space is obtained. For example, referring also to FIG. 10A, in the host FTL table, a host logical address HLBA1 indicates a host logical address 0 KB, a logical address index sLBA1 indicates the first logical address space of Zone 0, and Size1 is 10 KB; a host logical address HLBA2 indicates a host logical address 10 KB, a logical address index sLBA2 indicates the second logical address space of Zone 0, and Size2 is 20 KB; a host logical address HLBA3 indicates a host logical address 30 KB, a logical address index sLBA3 indicates the third logical address space of Zone 0, and Size3 is 30 KB. If the application 1010 needs to read, for example, 2 KB data starting from a host logical address (HLBA) 18K of the host logical address space, 2 KB data starting from the host logical address (HLBA) 18K is mapped to a 8 KB to 10 KB range of a logical address space indicated by the logical address index sLBA2 of the compressed ZNS. If the application 1010 needs to read, for example, 20 KB data starting from the host logical address (HLBA) 18K of the host logical address space, 2 KB data starting from the host logical address (HLBA) 18K is mapped to a 8 KB to 20 KB range of the logical address space indicated by the logical address index sLBA2 of the compressed ZNS, and a 0 KB to 8 KB range of a logical address space indicated by the logical address index sLBA3.

With continuing reference to step 1052, if the host logical address space corresponds to two-dimensional logical address spaces provided by a plurality of zones, logical address spaces indicated by logical address indexes (sLBA) in each zone are sorted by the sizes of the logical address indexes (sLBA), and among the zones, logical address spaces indicated by logical address indexes (sLBA) are sorted by the sizes of host logical addresses, in the host FTL table, corresponding to zones to which the logical address indexes (sLBA) belong. For example, in the host FTL table, a host logical address HLBA1 indicates a host logical address 0 KB, a logical address index sLBA1 indicates the first logical address space of Zone 100, and Size1 is 10 KB; a host logical address HLBA2 indicates a host logical address 10 KB, a logical address index sLBA2 indicates the second logical address space of Zone 100, and Size2 is 20 KB; a host logical address HLBA3 indicates a host logical address 30 KB, a logical address index sLBA3 indicates the first logical address space of Zone 1, and Size3 is 30 KB. If the application 1010 needs to read, for example, 20 KB data starting from the host logical address (HLBA) 18K of the host logical address space, 20 KB data starting from the host logical address (HLBA) 18K is mapped to a 8 KB to 20 KB range of a logical address space indicated by the logical address index sLBA2 of Zone100, and a 0 KB to 8 KB range of a logical address space indicated by the logical address index sLBA3 of Zone1. If can be understood that a part of the logical address index also indicates the zone number.

According to the embodiments shown in FIG. 10A, FIG. 10B, and FIG. 10C, optionally, the application 1010 accesses the storage device 1030 in A form of KV (key-value), where the host logical address (HLBA) is used as the key, and the host logical address space is a set of all possible values of the key. In an operation of adding a "key-value" pair to the storage device 1030 (Push (K, V)), a logical address index (sLBA) corresponding to the key K and the value V are provided in a write command to the storage device 1030 (or in an append command, the value V is written to the storage device 1030 and a corresponding logical address index (sLBA) is obtained), and the host address conversion unit 1020 records the key (in place of the host logical address (HLBA)), the logical address index, and optionally the size of the value (V), in the host FTL table. In an operation of obtaining the corresponding value of the same key from the storage device 1030 (Get(K)), the host address conversion unit 1020 queries the host FTL table by the key K to obtain a corresponding logical address index, and submits it to the storage device 1030 in a read command.

Therefore, according to the embodiments shown in FIG. 10A to FIG. 10C, the application 1010 does not need to be aware that the storage device 1030 compresses the stored data. The application 1010 accesses the storage device 1030 through the host logical address HLBA space. The storage device 1030 transparently provides the compressed ZNS to the application 1010. In an optional implementation, the host 1010 may be aware that the storage device 1030 is different from a block device supporting a ZNS in the prior art, because when the application 1010 accesses the host logical address HLBA space, only some of the elements (host logical address HLBA) are used and these elements have corresponding logical address indexes (sLBA) in the host FTL table, but the application 1010 cannot use other elements of the host logical address HLBA space, and when accessing these elements, the application 1010 will receive an error and cannot obtain corresponding data.

Figure 11A:
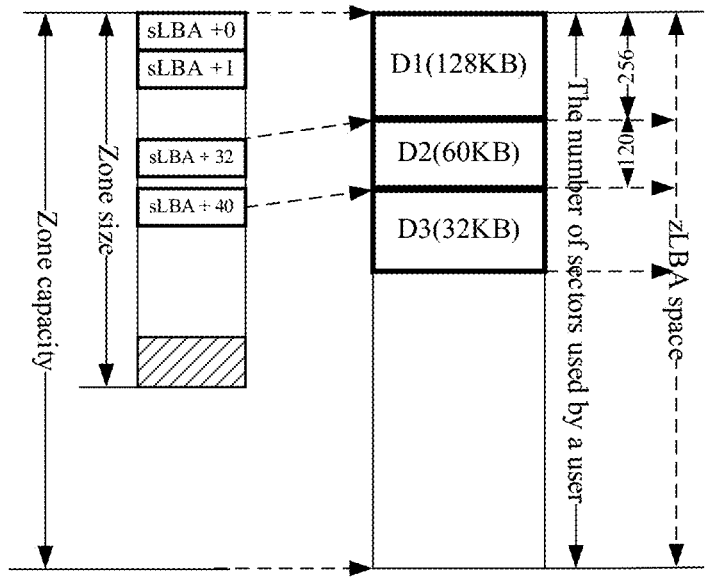
FIG. 11A is a schematic diagram of a zLBA space for a zone of a compressed ZNS according to an embodiment of the present application.

FIG. 11A is a schematic diagram of a zLBA space for a zone of a compressed ZNS according to an embodiment of the present application.

Each zone of the compressed ZNS according to the embodiments of the present application provides a zLBA space to the host. The zLBA space is a one-dimensional linear space, and elements of the zLBA space are denoted as zLBA. The elements of the zLBA space correspond or are in one-to-one correspondence to elements of the host HLBA space corresponding to the zone. When the logical block (sector) size of the host HLBA space is the same as the logical block size of the zLBA space, the elements of the zLBA space are in one-to-one correspondence to the elements of the host HLBA space corresponding to the zone.

FIG. 11A shows a single zone with the zone size being the number of logical address indexes available, and the zone capacity being the sum of the sizes of two-dimensional logical address spaces corresponding to all valid logical address indexes after the zone is full, where the size of the zLBA space is the same as the zone capacity.

According to the order of the valid logical address indexes (for example, the order of sizes), the two-dimensional logical address spaces corresponding to the valid logical address indexes are sequentially mapped to the zLBA space. In the example of FIG. 11A, for the valid logical address sLBA+0, the size of the corresponding two-dimensional logical address space is 128 KB (D1), and the corresponding zLBA space is 256 logical blocks starting from 0 (the size if each logical block is 512 bytes); for the valid logical address sLBA+32, the size of the corresponding two-dimensional logical address space is 60 KB (D2), and the corresponding zLBA space is 120 logical blocks starting from 256; and for the valid logical address sLBA+40, the size of the corresponding two-dimensional logical address space is 32 KB (D2), and the corresponding zLBA space is 64 logical blocks starting from 376.

By introducing the zLBA space, the two-dimensional logical address space provided by the compressed ZNS according to the embodiments of the present application is mapped into a one-dimensional space, so as to be consistent with the host logical address space HLBA in the prior art, thereby making it convenient for the host to use the storage device according to the embodiments of the present application.

Figure 11B:
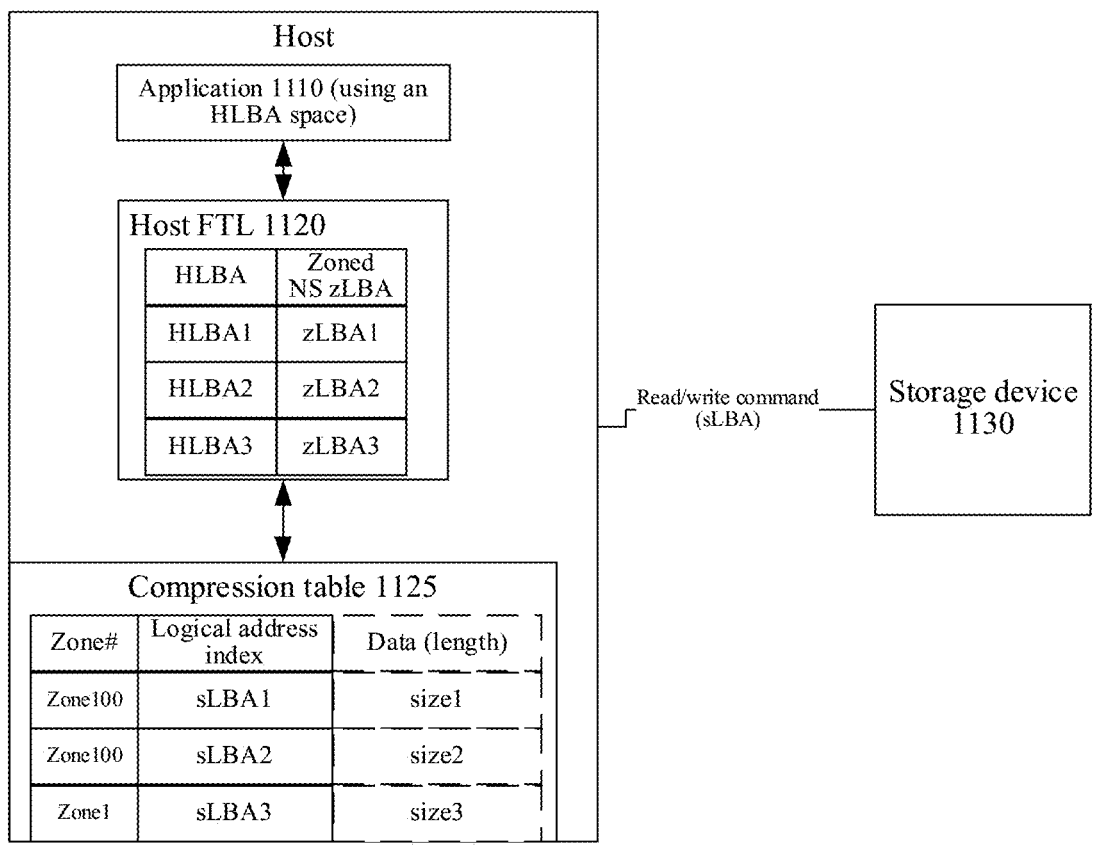
FIG. 11B is a schematic diagram of a host using a compressed ZNS according to another embodiment of the present application.

FIG. 11B is a schematic diagram of a host using a compressed ZNS according to another embodiment of the present application.

The host is coupled with a storage device 1130 according to the embodiments of the present application. The storage device 1130 according to the embodiments of the present application provides a compressed ZNS. An application 1110 runs in the host, and the application 1110 accesses the storage device 1130 according to the embodiments of the present application by using a host logical address (HLBA).

According to the embodiments of the present application, the host further includes (maintains) a host FTL table 1120, which is used to maintain the mapping between the host logical address HLBA and zLBA. An entry of the host FTL table 1120 does not need to record the size of a zLBA space corresponding to a zLBA in the entry. Optionally, the zLBA in the entry of the host FTL table includes the zone number (zone #) and an offset value in the zLBA space provided by the zone. Since the zLBA space is one-dimensional and linear, the host logical address HLBA in the host FTL table 1120 can also be one-dimensional and linear, and each element of the host logical address HLBA space can obtain a corresponding zLBA in the host FTL table 1120.

The host further includes (maintains) a compression table 1125. An entry of the compression table 1125 records a logical address index of a zone and the size of a corresponding two-dimensional logical address space. Optionally, the entry of the compression table 1125 further records the number (zone#) of the zone to which the logical address index belongs. Optionally, some fields of the logical address index indicate zone #.

By using the compression table 1125, zLBA can be mapped to a logical address space corresponding to the logical address index. Reference is also made to FIG. 11A for the way of mapping.

The host accesses the storage device 1130 by sending, for example, a read command, a write command, or an append command to the storage device 1130. As an example, the read command and the write command indicate a logical address index (sLBA), and the append command implies that the storage device 1030 provides a logical address index (sLBA) used for carrying written data. Optionally, in response to processing the write command and/or append command, the storage device 1130 further returns to the host the logical address index (sLBA) of the logical address space carrying the written data.

Figure 11C:
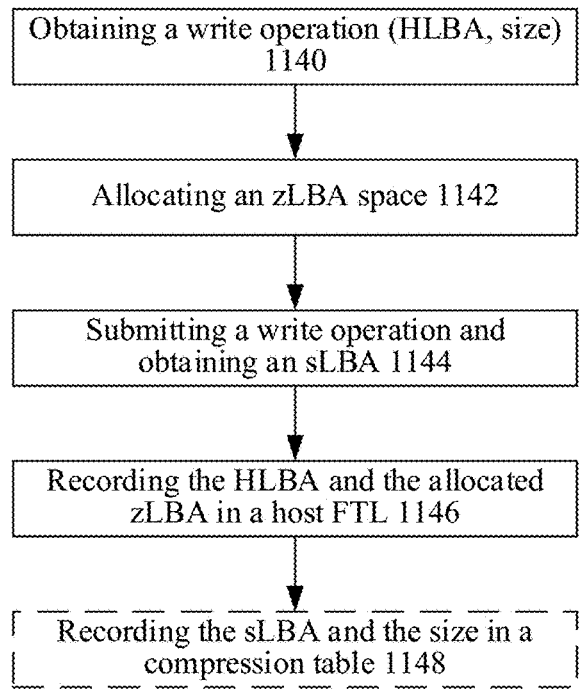
FIG. 11C and FIG. 11D are flowcharts of a host using a compressed ZNS according to embodiments of the present application.
Figure 11D:
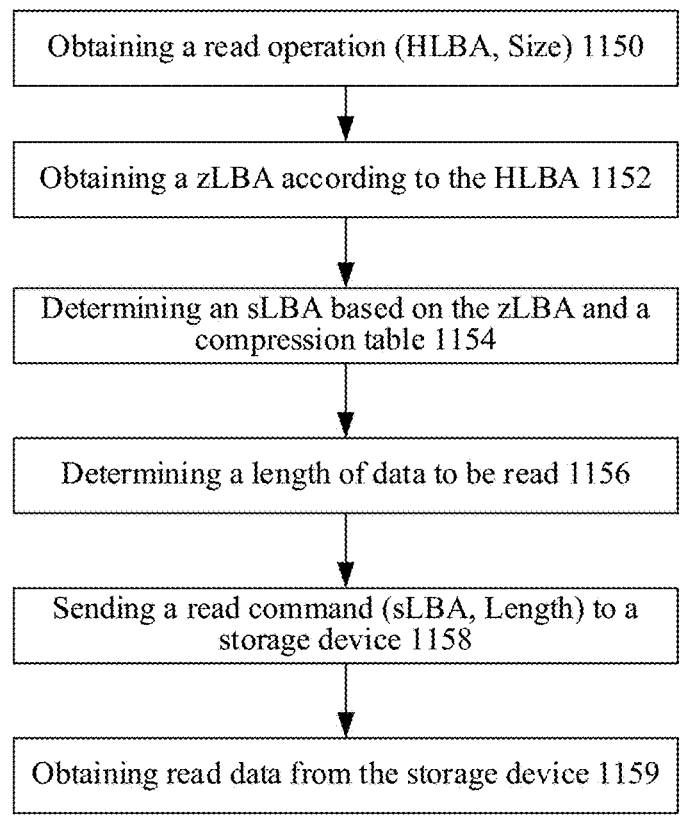

FIG. 11C and FIG. 11D are flowcharts of a host using a compressed ZNS according to embodiments of the present application.

With reference to FIG. 11C, the host writes data to the storage device 1130. The process shown in FIG. 11C is executed by a driver, a file system, and/or an operating system memory, etc. of the host. In order to write data to the host logical address space, the application 1110 indicates a write operation, where the host logical address (HLBA) and data to be written are indicated, and the data to be written has a size (denoted as size). A write operation 1140 is obtained. A zLBA space is allocated for the obtained write operation (1142). The allocated zLBA space is represented by one or more zLBAs. The zLBA includes, for example, a zone number (Zone #) and an offset value in a zLBA space provided by the zone. The size of the allocated zLBA space is determined according to the size of data to be written by the write operation.

A write command or an append command is submitted to the storage device 1130 according to the allocated zLBA space, where for the write command, a logical address index (sLBA) of a zone used for the allocated zLBA space is indicated in the write command, and for the append command, a logical address index (sLBA) returned by the storage device 1130 to indicate the completion of processing of the write command is obtained (1144). Still optionally, for a write command, the storage device 1130 also returns a logical address index (sLBA) to indicate the completion of processing of the write command, and according to the returned logical address index (sLBA), the host determines a logical address index (sLBA) used for the next write command for the same zone. For a newly allocated zone, when data is written to the zone for the first time, the logical address index indicated by the write command is a specified value (for example, zone #and value 0).

The host logical address (HLBA) obtained in step 1140 and the zLBA space (1146) obtained in step 1042 are recorded in the host FTL table 1120. Optionally, if the size of the data to be written by the write operation corresponds to a plurality of host logical addresses HLBA, a plurality of entries are recorded in the host FTL table 1120, each entry corresponds to one of the host logical addresses HLBA, and a zLBA corresponding to the HLBA is also recorded in each entry.

The logical address index obtained in step 1144 and the size of the written data are recorded in the compression table 1125 (1148).

With reference to FIG. 11D, the host reads data from the storage device 1130. The process shown in FIG. 11D is executed by a driver, a file system, and/or an operating system memory, etc. of the host. In order to read data from the host logical address space, the application 1110 indicates a read operation, in which a host logical address (HLBA) and the size of data to be read are indicated. A read operation 1150 is obtained. A host FTL table is queried through a host logical address (HLBA) indicated by the read operation to obtain a zLBA (1152). According to the obtained zLBA, a logical address index (sLBA) corresponding to the zLBA is determined according to the compression table 1125 (1154). Optionally, two or more logical address indexes (sLBA) corresponding to the host logical address space to be read are determined according to the obtained zLBA, the size of data to be read, and the compression table 1125.

The data length to be read is determined according to the size to be read obtained in step 1150 (1156). Optionally, if the data to be read corresponds to a plurality of logical address indexes, the data length to be read for each logical address index is further determined, or the range of a two-dimensional logical address space corresponding to each logical address index is determined.

According to the obtained logical address index (sLBA) and the corresponding data length, the read command is submitted to the storage device 1130 (1158). Data to be read by the read command is read from the storage device 1130 (1159).

Returning to step 1154, for example, in the host FTL table, a host logical address HLBA1 indicates logical block 0 of the host logical address space, zLBA1 indicates logical block 0 of Zone 100, a host logical address HLBA2 indicates logical block 20 of the host logical address space, zLBA2 indicates logical block 20 of Zone 100, a host logical address HLBA3 indicates logical block 60 of the host logical address space, and zLBA3 indicates logical block 0 of Zone 1. The values of HLBA2 and HLBA1 further imply that the size of the host logical address space from HLBA1 to HLBA2 is 20 (=20−0) logical blocks (for example, 10 KB), the values of HLBA2 and HLBA3 imply that the size of the host logical address space from HLBA2 to HLBA3 is 40 (=60−40) logical blocks (for example, 20 KB), the values of zLBA1 and zLBA2 imply that the size of the zLBA space from zLBA1 to zLBA2 is 20 logical blocks, and the values of zLBA2 and zLBA3 imply that the size of the zLBA space from zLBA2 to zLBA3 is 40 logical blocks. Moreover, since zLBA3 corresponds to the starting logical block of another zone (Zone 1), it also implies that the introduction of the zLBA space between zLBA2 and zLBA3 makes the zLBA space provided by Zone 100 full. In the compression table 1125, both the two logical address indexes (sLBA1 and sLBA) of zone 100 and the sizes of their corresponding two-dimensional logical address spaces are recorded, and the two two-dimensional logical address spaces are sequentially mapped to zLBA spaces of zone 100. In the host FTL table 1120, HLBA3 is after HLBA2, which implies that the zLBA space provided by zone1 where zLBA3 is located is sorted after the zLBA space provided by zone100 where zLBA2 is located. Thus, the zLBA space corresponding to the host logical address HLBA space is obtained according to the host FTL table 1120, the location, in the zLBA space, of the two-dimensional logical address space corresponding to each logical address index in the compression table 1125 is obtained according to the compression table 1125, so that the mapping between the host logical address HLBA and the logical address index sLBA is established through the zLBA space.

It can be understood that zLBAs corresponding to some host logical addresses HLBA in the host FTL table 1120 are not mapped to the starting point of two-dimensional logical address spaces, but are mapped to the insides of the two-dimensional logical address spaces. In step 1154, logical address indexes (sLBA) corresponding to the two-dimensional logical address spaces to which such zLBAs are mapped are obtained as determined logical address indexes (sLBA).

Therefore, according to the embodiments shown in FIG. 11A to FIG. 11D, the host FTL table 1120 maintains a linear host logical address HLBA space to a linear zLBA space. Therefore, neither the application 1110 nor the host FTL table 1120 needs to be aware that the storage device 1130 compresses the stored data. The application 1010 accesses the storage device 1030 through the host logical address HLBA space. The storage device 1130 transparently provides the compressed ZNS to the application 1110 and the host FTL table 1120. Optionally, each element of the host logical address HLBA space can be read by the application 1110.

Although the preferred embodiments of the present application are described, those skilled in the art can make additional changes and modifications to these embodiments once they learn a basic creative concept. Therefore, the appended claims are intended to be interpreted as including the preferred embodiments and all changes and modifications falling within the scope of the present application. Apparently, those skilled in the art can make various modifications and changes to the present application without departing from the spirit and scope of the present application. In this way, if these modifications and changes of the present application fall within the scope of the claims of the application and their equivalent technologies, the present application is also intended to include these modifications and changes.

The invention claimed is:

1. A method for processing an IO command comprising:
providing, by a host to a storage device, a first command for writing data to a first storage zone;
allocating, by the storage device according to a Write Pointer (WP) of the first storage zone, a first logical address index to the data to be written by the first command, wherein two dimensions including (i) the first logical address index and (ii) a first size of the data to be written by the first command define a first logical address space, and a starting address of the first logical address space is called the first logical address index;
compressing the data to be written by the first command to obtain compressed data; storing the compressed data; recording an address for storing the compressed data in association with the first logical address index; and providing the first logical address index to the host; and
recording, by the host, a first host logical address (HLBA) accessed by the first command in association with the first logical address index; wherein
the method further comprises providing a former command for writing data to a storage zone, wherein
the former command is provided prior to the first command, and
a difference between the first logical address index and a logical address index of a logical address space allocated to the former command represents a size of a compressed data corresponding to the former command;
the method further comprises:
allocating, by the host, a first zLBA space from a zLBA space of the first storage zone and generating the first command for writing data to the first storage zone, wherein the first zLBA space has a size capable of holding the data to be written by the first command; wherein the zLBA space of the first storage zone is a one-dimensional linear space, and has a size as same as a capacity of the first storage zone, and each element of the zLBA space is addressed by a zLBA; and
recording, by the host, the first host logical address (HLBA) accessed by the first command in association with the first zLBA space, wherein elements of a host logical address (HLBA) space defined by the first host logical address (HLBA) and the first size correspond to elements of the first zLBA space.

2. The method according to claim 1, wherein
the storage device uses the Write Pointer (WP) of the first storage zone as the first logical address index, or uses a key generated according to the Write Pointer (WP) of the first storage zone as the first logical address index; and
the method further comprises: updating, by the storage device, the Write Pointer (WP) of the first storage zone according to a size of the compressed data.

3. A method for processing an IO command comprising:
providing, by a host to a storage device, a first command for writing data to a first storage zone, wherein the first command indicates a first logical address index;
compressing, by the storage device, the data to be written by the first command to obtain compressed data; storing the compressed data; recording an address for storing the compressed data in association with the first logical address index; generating a second logical address index according to the first logical address index and a size of the compressed data, and providing the second logical address index to the host;
updating, by the storage device, a Write Pointer (WP) of the first storage zone according to the size of the compressed data;
updating, by the host, the Write Pointer (WP) of the first storage zone with the second logical address index; and
recording, by the host, a first host logical address (HLBA) accessed by the first command in association with the first logical address index, wherein the first logical address index and a first size of the data to be written by the first command define a first logical address space.

4. The method according to claim 3, further comprising:
providing, by the host to the storage device, a second command for writing data to the first storage zone, wherein the second command indicates the second logical address index; and
compressing, by the storage device, the data to be written by the second command to obtain a second compressed data; storing the second compressed data; recording an address for storing the second compressed data in association with the second logical address index; generating a third logical address index according to the second logical address index and a size of the second compressed data, and providing the third logical address index to the host, wherein the second logical address index and a second size of the data to be written by the second command define a second logical address space.

5. The method according to claim 4, wherein
there is no associated logical address index for one or more host logical addresses of the host; and the method further comprises
providing, by the host to the storage device, a third command for reading data from a third host logical address,
in response to the host not obtaining the third logical address index associated with the third host logical address, indicating an error, and
in response to the host obtaining the third logical address index associated with the third host logical address, reading, by the host, the data from the third host logical address indicated by the third command.

6. The method according to claim 5, further comprising:
allocating, by the host, a first zLBA space from a zLBA space of the first storage zone and generating the first command for writing data to the first storage zone, wherein the first zLBA space has a size capable of holding the data to be written by the first command;
wherein the zLBA space of the first storage zone is a one-dimensional linear space, and has a size as same as a capacity of the first storage zone, and each element of the zLBA space is addressed by a zLBA; and
recording, by the host, the first host logical address (HLBA) accessed by the first command in association with the first zLBA space, wherein elements of a host logical address (HLBA) space defined by the first host logical address (HLBA) and the first size correspond to elements of the first zLBA space.

7. The method according to claim 2, further comprising:
providing, by the host to the storage device, a second command for writing data to the first storage zone; and
allocating, by the storage device according to the updated Write Pointer (WP), a second logical address index to the data to be written by the second command, wherein
the second logical address index and a second size of the data to be written by the second command define a second logical address space, and
the difference between the second logical address index and the first logical address index is smaller than the first size, while the second logical address space and the first logical address space do not overlap.

8. The method according to claim 7, wherein
there is no associated logical address index for one or more host logical addresses of the host;
the method further comprises
providing, by the host to the storage device, a third command for reading data from a third host logical address,
in response to the host not obtaining a third logical address index associated with the third host logical address, indicating an error, and
in response to the host obtaining the third logical address index associated with the third host logical address, reading, by the host, the data from the third host logical address indicated by the third command.

9. The method according to claim 8, wherein
a logical address index, which is not associated with an NVM address, in the storage device is an invalid logical address index;
a logical index associated with an NVM address is a valid logical address index; and
the sum of sizes of all logical address spaces defined by all valid logical address indexes of a zone are accumulated to obtain the zone capacity of the zone.

10. The method according to claim 9, further comprising:
providing, by the host to the storage device, a fourth command for reading data from a fourth logical address index;
identifying, by the storage device, whether the fourth logical address index is a valid logical address index;
in response to that the fourth logical address index is a valid logical address index,
reading fourth compressed data according to the fourth logical address index;
decompressing the fourth compressed data to obtain fourth decompressed data; and
using all or part of the fourth decompressed data as a processing result of the fourth command; and
in response to that the fourth logical address index is not a valid logical address index,
sending, by the storage device, a processing result of the fourth command to the host, wherein the processing result of the fourth command indicates an error in the fourth command.

11. The method according to claim 10, further comprising:
providing, by the host to the storage device, a fifth command indicating a fifth length; and
in response to that a size of a fifth decompressed data of the fifth command is smaller than a fourth length of the fourth command,
reading, by the storage device, sixth compressed data after the fourth compressed data according to an address of the fourth compressed data;
decompressing the sixth compressed data to obtain sixth decompressed data;
repeating said reading and decompressing of the sixth compressed data until the sum of sizes of all decompressed data read is not smaller than the fourth length; and
using a part, which starts from a beginning and has a length equal to the fourth length, of all the decompressed data read as a whole as a processing result of the fourth command.

12. The method according to claim 10, further comprising:
providing, by the host to the storage device, a sixth command for reading data from a sixth logical address index, wherein the sixth command indicates a plurality of logical addresses and a plurality of lengths corresponding to each of the plurality of logical addresses; and
in response to that a first logical address in the plurality of logical addresses is a valid logical address index,
reading compressed data according to the first logical address,
decompressing the compressed data according to the first logical address to obtain complete data of a sixth logical address space corresponding to the first logical address, and
obtaining a plurality of pieces of data from the complete data of the sixth logical address space according to the plurality of logical addresses indicated by the sixth command and the plurality of lengths corresponding to each of the plurality of logical addresses as a processing result of the sixth command.

13. The method according to claim 8, wherein
a length of the compressed data in association with the first logical address index is obtained from an NVM according to the first logical address index, or determined according to a distance between the first logical address index and a next valid logical address index.

14. The method according to claim 8, wherein
the first command further indicates a first length of the data to be read; and
the method further comprises:
reading the compressed data according to the first logical address index;
decompressing the compressed data in association with the first logical address index to obtain first decompressed data;
in response to a size of the first decompressed data being smaller than the first length,
reading second compressed data on an NVM;
decompressing the second compressed data to obtain second decompressed data;
repeating said reading and decompressing the second compressed data until a sum of sizes of all decompressed data read is not smaller than the first length, wherein the sizes of the all decompressed data includes the size of the first decompressed data and a size of the second decompressed data; and
using a part of the all decompressed data, read as a whole, as a processing result of the first command, wherein the part of the all decompressed data starts from a beginning of the first decompressed data and ends at a portion of the second decompressed data to have a length equal to the first length.

15. The method according to claim 8, further comprising:
providing, by the host to the storage device, a second command for reading data from the first storage zone, wherein the second command indicates a plurality of logical addresses and a plurality of lengths corresponding to each of the plurality of logical addresses; and
in response to that a first logical address in the plurality of logical addresses is a valid logical address index,
reading compressed data according to the first logical address,
decompressing the compressed data according to the first logical address to obtain complete data of a second logical address space corresponding to the first logical address, and
obtaining a plurality of pieces of data from the complete data of the second logical address space according to the plurality of logical addresses indicated by the second command and the plurality of lengths corresponding to each of the plurality of logical addresses as a processing result of the second command.

16. The method according to claim 8, further comprising:
providing, by the host to the storage device, a third command for reading data from the first storage zone, wherein the third command indicates a third logical address index and a third length; and
in response to that the third logical address index is a valid logical address index,
reading, by the storage device, third compressed data according to the third logical address index,
decompressing the third compressed data to obtain third decompressed data,
in response to that a length of the third decompressed data is smaller than the third length,
obtaining a next valid logical address index adjacent to the third logical address index from an FTL table according to the third logical address index,
reading fourth compressed data according to the next valid logical address index,
decompressing the fourth compressed data to obtain fourth decompressed data, and
using a part, of the all decompressed data, read as a whole, as a processing result of the third command, wherein the part of the all decompressed data starts from a beginning of the third decompressed data and ends at a portion of the fourth decompressed data to have a length equal to the third length.

17. The method according to claim 16, further comprising:
in response to that a sum of the length of the third decompressed data and a length of a fourth decompressed data is smaller than the third length,
continuing to obtain a next valid logical address index from the FTL table, and
reading compressed data from an NVM according to the obtained valid logical address index, wherein a sum of lengths of decompressed data of all the compressed data read directly is not smaller than the third length.

18. A storage system, comprising a host and a storage device, wherein the host sends, to the storage device, a first command for writing data to a first storage zone;
the storage device obtains the first command; allocates, according to a Write Pointer (WP) of the first storage zone, a first logical address index to the data to be written by the first command, wherein two dimensions including (i) the first logical address index and (ii) a first size of the data to be written by the first command define a first logical address space, and a starting address of the first logical address space is called the first logical address index; compresses the data to be written by the first command to obtain compressed data; stores the compressed data; records an address for storing the compressed data in association with the first logical address index, and provides the first logical address index as a response to the first command;
the host obtains a processing result of the first command for writing data provided by the storage device, and records a logical address index indicated by the processing result of the first command for writing data, in association with a host logical address accessed by the first command for writing data; wherein
the host sends, to the storage device, a former command for writing data to a storage zone, wherein
the former command is sent prior to the first command, and
a difference between the first logical address index and a logical address index of a logical address space allocated to the former command represents a size of a compressed data corresponding to the former command;
the host allocates a first zLBA space from a zLBA space of the first storage zone and generates the first command for writing data to the first storage zone, wherein the first zLBA space has a size capable of holding the data to be written by the first command; wherein the zLBA space of the first storage zone is a one-dimensional linear space, and has a size as same as a capacity of the first storage zone, and each element of the zLBA space is addressed by a zLBA; and the host records the first host logical address (HLBA) accessed by the first command in association with the first zLBA space, wherein elements of a host logical address (HLBA) space defined by the first host logical address (HLBA) and the first size correspond to elements of the first zLBA space.

\* \* \* \* \*